United States Patent
Kanno

(10) Patent No.: US 12,399,817 B2
(45) Date of Patent: Aug. 26, 2025

(54) MEMORY SYSTEM AND METHOD OF CONTROLLING THE MEMORY SYSTEM

(71) Applicant: Kioxia Corporation, Tokyo (JP)

(72) Inventor: Shinichi Kanno, Ota (JP)

(73) Assignee: Kioxia Corporation, Tokyo (JP)

( * ) Notice: Subject to any disclaimer, the term of this patent is extended or adjusted under 35 U.S.C. 154(b) by 0 days.

(21) Appl. No.: 18/595,633

(22) Filed: Mar. 5, 2024

(65) Prior Publication Data
US 2024/0311291 A1 Sep. 19, 2024

(30) Foreign Application Priority Data
Mar. 16, 2023 (JP) ................... 2023-041614

(51) Int. Cl.
G06F 12/02 (2006.01)

(52) U.S. Cl.
CPC .. G06F 12/0246 (2013.01); *G06F 2212/7203* (2013.01)

(58) Field of Classification Search
None
See application file for complete search history.

(56) References Cited

U.S. PATENT DOCUMENTS

| | | | |
|---|---|---|---|
| 10,013,177 B2 | 7/2018 | Liu et al. | |
| 2009/0175084 A1* | 7/2009 | Norman | G11C 7/1084 |
| | | | 365/189.05 |
| 2010/0017542 A1* | 1/2010 | Merry, Jr. | G06F 3/0656 |
| | | | 710/56 |
| 2020/0065240 A1* | 2/2020 | Choi | G06F 3/0604 |
| 2020/0073795 A1* | 3/2020 | Asano | G06F 3/0656 |
| 2021/0165733 A1* | 6/2021 | Lee | G06F 11/1469 |
| 2022/0197543 A1 | 6/2022 | Lai et al. | |
| 2022/0222011 A1 | 7/2022 | Choi et al. | |
| 2023/0066344 A1* | 3/2023 | Rajendiran | G06F 3/0619 |
| 2023/0221885 A1* | 7/2023 | Moon | G06F 3/0656 |
| | | | 711/154 |

* cited by examiner

*Primary Examiner* — Kevin Verbrugge
(74) *Attorney, Agent, or Firm* — Oblon, McClelland, Maier & Neustadt, L.L.P.

(57) ABSTRACT

According to one embodiment, a memory system includes a nonvolatile memory, a first write buffer, a second write buffer having a capacity smaller than that of the first write buffer and a bandwidth larger than that of the first write buffer, and a controller. When the write speed of the first group is less than a first value, the controller loads unloaded data among first data into the first write buffer, and after an amount of the first data reaches or exceeds a minimum write size, writes the first data to a first write destination block. When the write speed of the second group is greater than or equal to the first value, the controller loads second data having the minimum write size into the second write buffer and writes the second data to the second write destination block.

14 Claims, 10 Drawing Sheets

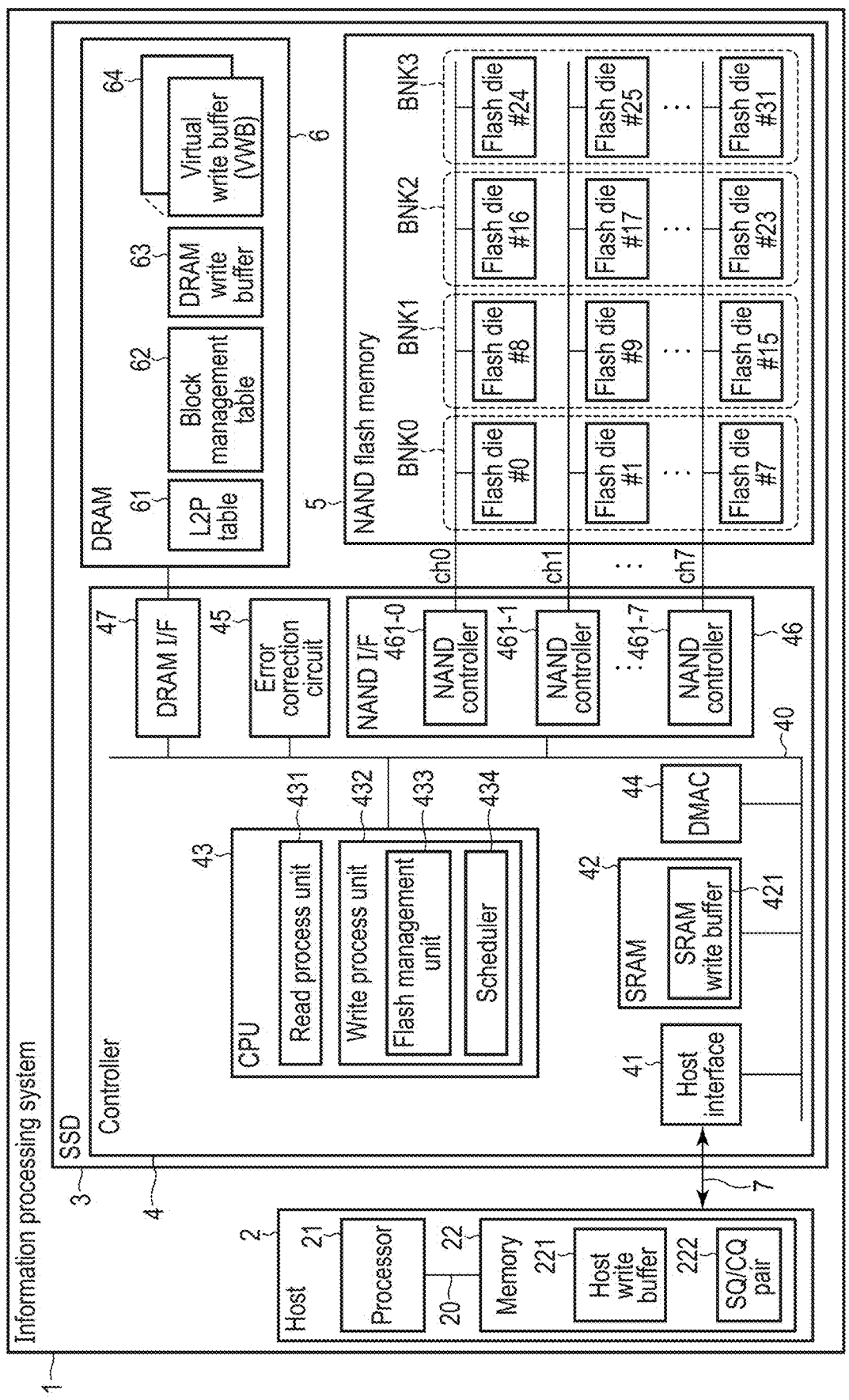
F I G. 1

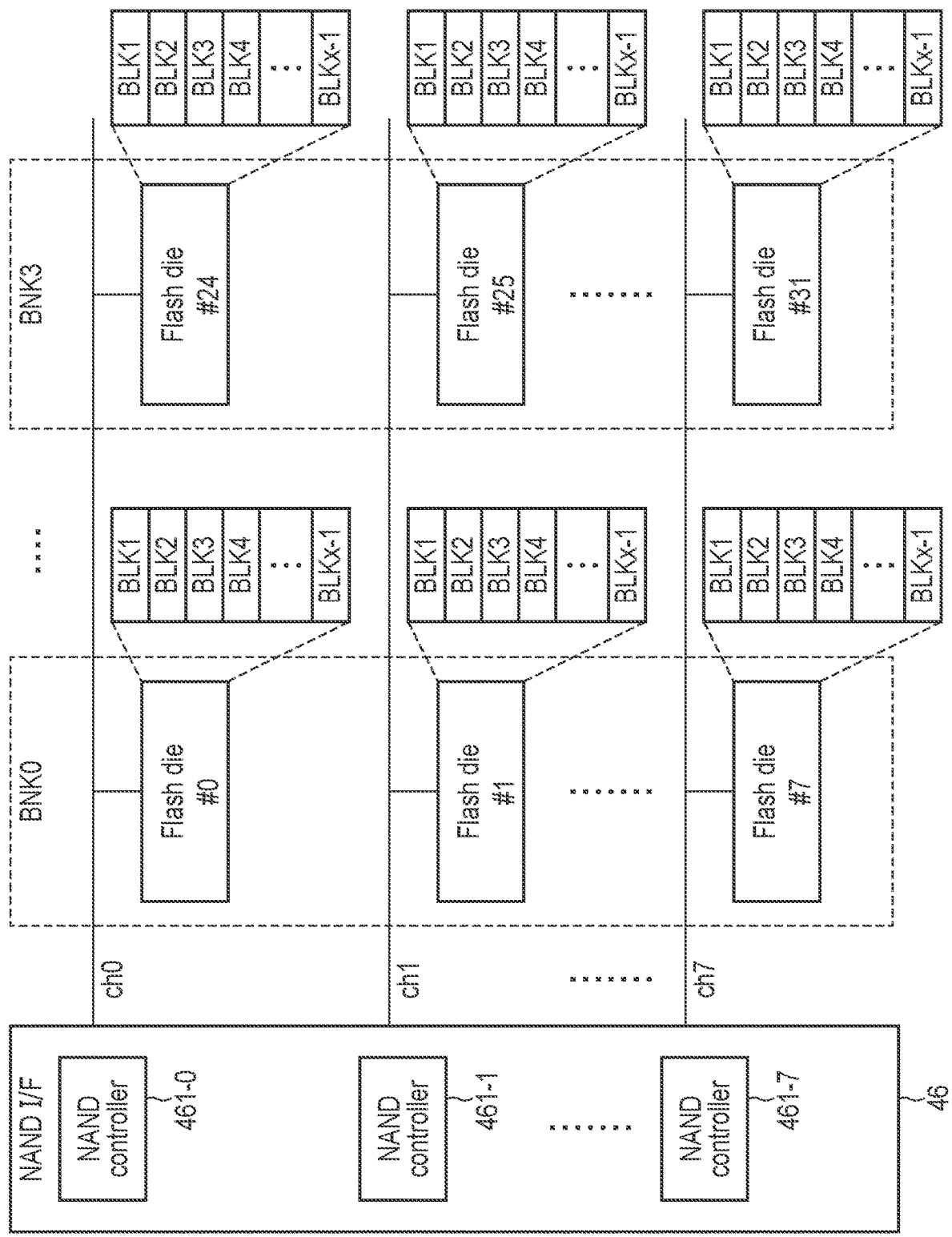
F I G. 2

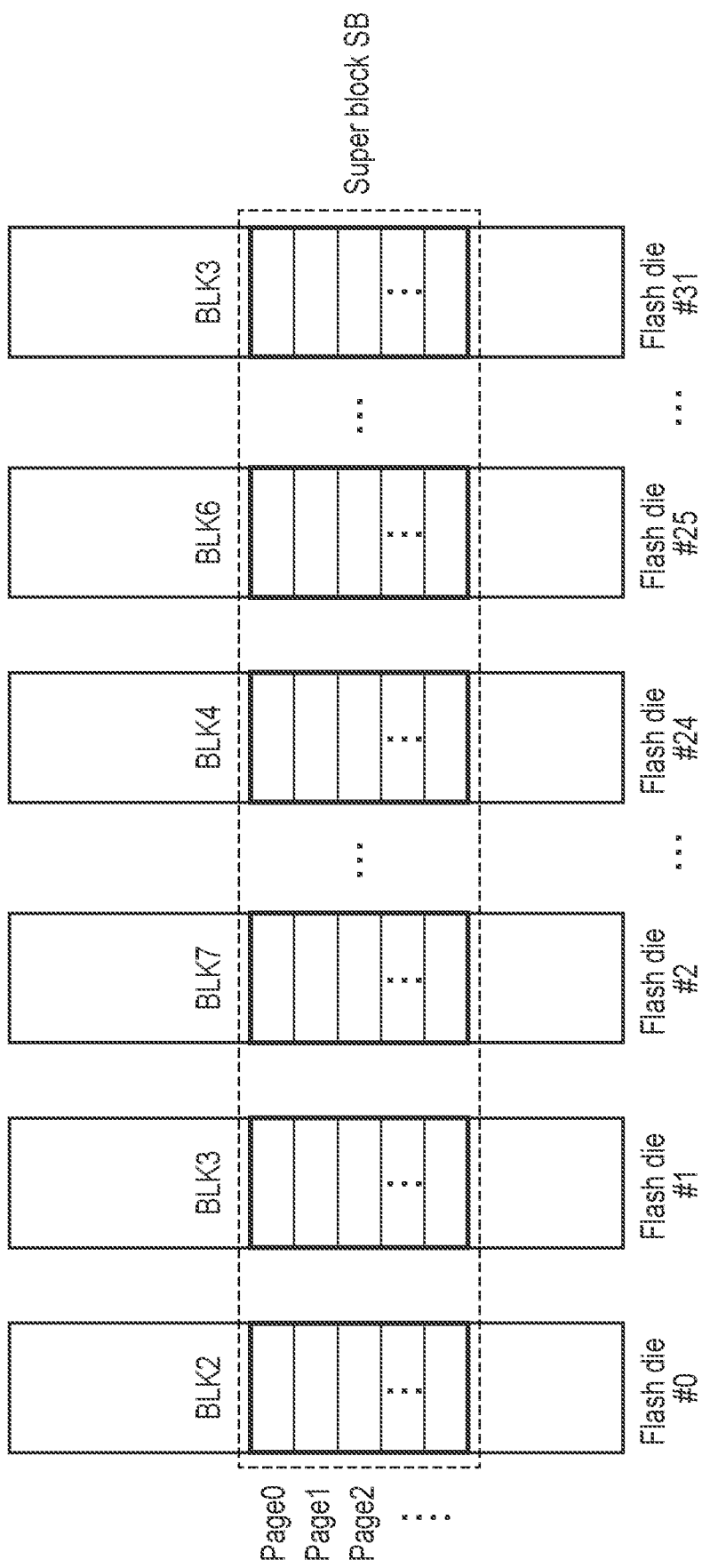
F I G. 3

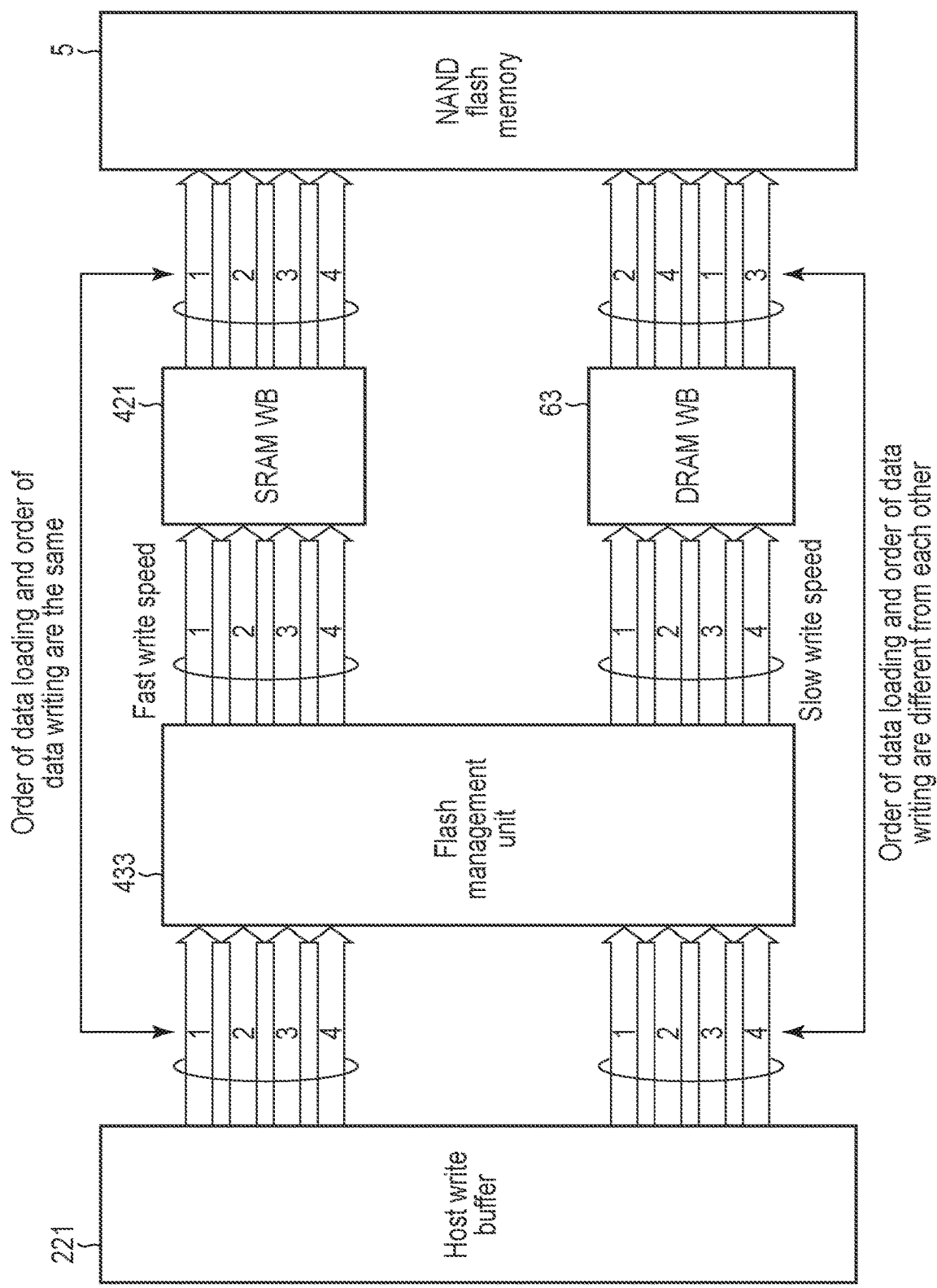
F I G. 6

MEMORY SYSTEM AND METHOD OF CONTROLLING THE MEMORY SYSTEM

CROSS-REFERENCE TO RELATED APPLICATIONS

This application is based upon and claims the benefit of priority from Japanese Patent Application No. 2023-041614, filed Mar. 16, 2023, the entire contents of which are incorporated herein by reference.

FIELD

Embodiments described herein relate generally to a memory system including a nonvolatile memory and a method of controlling the memory system.

BACKGROUND

Memory systems implemented with a nonvolatile memory have recently become widespread. As one of such memory systems, a solid state drive (SSD) including a nonvolatile memory such as a NAND flash memory and a controller that controls the nonvolatile memory is known.

The controller of the memory system processes input/output (I/O) signals (data, commands) received from an external host via a host interface conforming to a certain standard, and thus performs a read process for reading data from the nonvolatile memory and a write process for writing data to the nonvolatile memory.

In the memory system, there is a need for a technology that can improve the performance of write process.

BRIEF DESCRIPTION OF THE DRAWINGS

FIG. 1 is a block diagram illustrating an example of a configuration of an information processing system including a memory system according to an embodiment.

FIG. 2 is a block diagram illustrating an example of a configuration of a relationship between a plurality of channels and a plurality of flash memory dies used in the memory system according to the embodiment.

FIG. 3 is a diagram illustrating an example of a configuration of a super block used in the memory system according to the embodiment.

FIG. 6 is a diagram illustrating a flow of write data in a write process of the memory system according to the embodiment.

DETAILED DESCRIPTION

Figure 4:
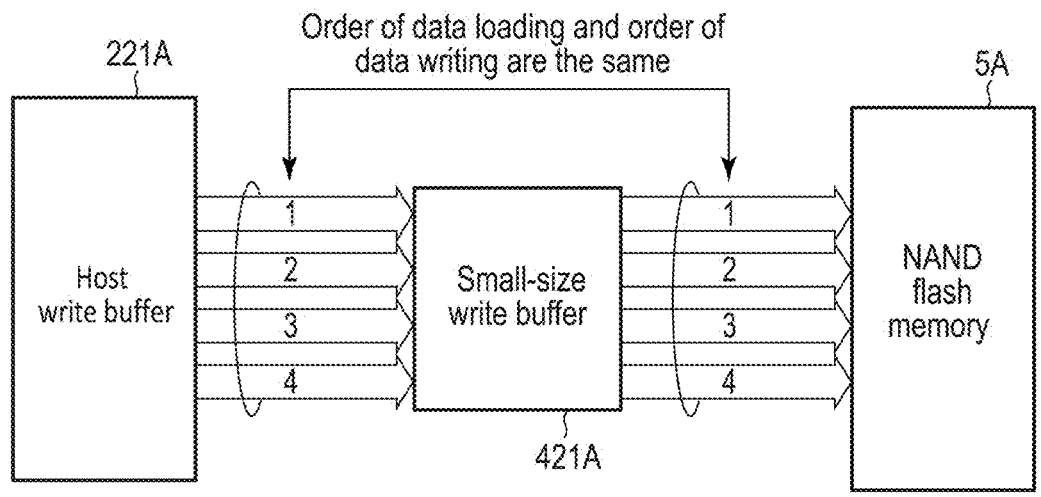
FIG. 4 is a diagram illustrating a flow of write data in a write process of a memory system according to a first comparative example.

Various embodiments will be described hereinafter with reference to the accompanying drawings.

In general, according to one embodiment, a memory system comprises a nonvolatile memory including a plurality of blocks, a first write buffer, a second write buffer having a capacity smaller than that of the first write buffer and a bandwidth greater than that of the first write buffer, and a controller. The controller is configured to manage a plurality of write destination blocks allocated from the plurality of blocks. The controller is capable of receiving, from a host, a write command that includes first information indicating a size of data to be written to the nonvolatile memory and second information that is able to directly or indirectly specify a write destination block associated with the data. The controller classifies the received write command into a first group for writing data to a first write destination block or a second group for writing data to a second write destination block, based on the second information included in the received write command. The controller determines, based on the first information included in the received write command, whether a write speed, which indicates an amount of data required to be written per predetermined time, is greater than or equal to a first value for each of the first and second groups. When the write speed of the first group is less than the first value, the controller loads unloaded data among first data associated with the first group from a memory of the host into the first write buffer, and after an amount of the first data reaches or exceeds a minimum write size of the nonvolatile memory, writes the first data to a first write destination block allocated to the first group. When the write speed of the second group is greater than or equal to the first value, the controller loads second data associated with the second group and having the minimum write size from the memory of the host into the second write buffer, and writes the second data to a second destination block allocated to the second group.

In the following descriptions, such a case is assumed that the memory system according to the embodiment is implemented as a solid state drive (SSD). FIG. 1 is a block diagram illustrating an example of a configuration of an information processing system 1 including the memory system according to the embodiment. The information processing system 1 includes a host (host device) 2 and an SSD 3.

The host 2 is an information processing apparatus. The host 2 is, for example, a personal computer, a server computer, or a mobile device. The host 2 accesses the SSD 3. More specifically, the host 2 issues a write command, which is a command for writing data, to the SSD 3. Further, the host 2 issues a read command, which is a command for reading data, to the SSD 3.

The SSD 3 is a storage device which is connectable to the host 2. The SSD 3 includes a nonvolatile memory. The SSD 3 can write data to an internal nonvolatile memory. The SSD 3 can read data from the internal nonvolatile memory.

Communication between the SSD 3 and the host 2 is performed via a bus 7. The bus 7 is a transmission path which connects the host 2 and the SSD 3 to each other. The bus 7 is, for example, a PCI Express™ (PCIe™) bus. The PCIe bus is a full duplex transmission path. The full duplex transmission path includes both a transmission path for transmitting data and input/output (I/O) commands from the host 2 to the SSD 3 and a transmission path for transmitting data and responses from the SSD 3 to the host 2. The I/O command is, for example, a command for performing writing of data to the nonvolatile memory or a command for performing reading of data from the nonvolatile memory. The I/O command is, for example, a write command or a read command.

As a standard of a logical interface for connecting the host 2 and the SSD 3, for example, a standard of NVM Express™ (NVMe™) may be used. In the interface conforming to the NVMe™ standard, communication between the host 2 and the SSD 3 is performed using a pair of queues that includes at least one submission queue (SQ) and a completion queue (CQ) associated with the at least one submission queue (SQ). This pair of queues is referred to as a submission queue/completion queue pair (SQ/CQ pair).

Next, the configuration of the host 2 will be described.

The host 2 includes a processor 21 and a memory 22. The processor 21 and the memory 22 are interconnected via an internal bus 20.

The processor 21 is, for example, a CPU. The processor 21 executes software (host software) loaded into the memory 22 from the SSD 3 or some other storage device connected to the host 2. The host software includes, for example, an operating system, a file system, and application programs.

The memory 22 is, for example, a volatile memory. The memory 22 may as well be referred to as a main memory, system memory, or host memory. The memory 22 is, for example, a dynamic random access memory (DRAM). A part of the memory area of the memory 22 is used as a host write buffer 221. The host write buffer 221 is a memory area that temporarily stores data to be written to the nonvolatile memory of the SSD 3.

Further, another part of the memory area of the memory 22 is used to store SQ/CQ pairs 222. Each of submission queues SQs included in the SQ/CQ pairs 222 is a queue used to issue I/O commands (write commands and read commands) to the SSD 3. Each of the submission queues SQ includes a plurality of slots. Each of the slots can store one I/O command. The host 2 creates the submission queue SQ in the memory 22 of the host 2. Further, the host 2 issues a submission queue create command to the SSD 3. The addresses indicating the memory location in the memory 22 where each of these submission queues SQ is created, the size of each of these submission queues SQ, the identifier of the completion queue CQ associated with these submission queues SQ and the like are notified to the SSD 3 by the submission queue create command.

The completion queue CQ included in the SQ/CQ pair 222 is a queue used to receive from the SSD 3 a completion response indicating the completion of the I/O command. The completion response includes information that indicates a status of success or failure of the processing of the completed command. The completion response may as well be referred to as a command completion or a command completion notification. The completion queue CQ includes a plurality of slots. Each of these slots can store one completion response. The host 2 creates the completion queue CQ in the memory 22 of the host 2. Further, the host 2 issues a completion queue create command to the SSD 3. The address which indicate the memory locations in the memory 22 where the completion queue CQ is created, the size of this completion queues CQ and the like are notified to the SSD 3 by the completion queue create command.

Next, the internal configuration of the SSD3 will be described. In the following descriptions, such a case is assumed that the nonvolatile memory included in the SSD 3 is implemented by a NAND flash memory. Note that the NAND flash memory may as well be some other flash memory or some other nonvolatile memory such as MRAM, ReRAM, FeRAM, phase-change memory or the like.

The SSD 3 includes a controller 4 and a NAND flash memory 5. Further, the SSD 3 may as well include a random access memory, for example, a dynamic random access memory (DRAM) 6, which is a volatile memory.

The NAND flash memory 5 may be a flash memory of a two-dimensional structure or a three-dimensional structure. The NAND flash memory 5 includes a plurality of blocks. Each of the plurality of blocks is the smallest unit of data erase operation. Each of the plurality of blocks may as well be referred to as a memory block or a physical block. Each of the plurality of blocks includes a plurality of pages. Each of the pages is a unit for each of the data write operations and data read operations. Each page includes a set of memory cells connected to the same word line. Each page may as well be referred to as a physical page.

The NAND flash memory 5 includes a plurality of dies. Each die may as well be referred to as a memory die, a flash die, a memory chip or a flash chip. Each of these dies is implemented as a NAND flash memory die. Hereafter, a die will be referred to as a flash die. FIG. 1 shows the case where the NAND flash memory 5 includes thirty two flash dies #0 to #31 as an example.

The controller 4 is a memory controller. The controller 4 is, for example, a control circuit such as a system-on-a-chip (SoC). The controller 4 is electrically connected to each of the NAND flash memory 5 and the DRAM 6. The controller 4 performs a read process for reading data from the NAND flash memory 5 and a write process for writing data to the NAND flash memory 5 by processing each of the I/O commands received from the host 2. As a physical interface which connects the controller 4 and the NAND flash memory 5 to each other, a Toggle interface or an open NAND flash interface (ONFI) is used. The function of each part of the controller 4 can be implemented by dedicated hardware, a processor which executes a program, or a combination of the dedicated hardware and the processor.

The controller 4 manages a plurality of write destination blocks. Each write destination block is a block in an open state (a block in which data is being written) to which data can be written. In the write process, the controller 4 executes a process for writing different types of data to different write destination blocks. Note here that these different types of data are, for example, data from different applications, data from different end users (different tenants such as containers and virtual machines), data having different lifetimes, and the like.

For example, in the case where write data are transmitted respectively from different applications at different timings and the write data are written by the SSD3 in the order in which they are transmitted, a single block may contain a mixture of data from different applications. In such a case, the frequency of performing garbage collection, which involves exchanging data between blocks is increased, thereby degrading the write amplification (write processing efficiency). In order to prevent such degradation in write processing efficiency, a stream write operation, in which data is grouped by application and these data are written to contiguous physical addresses of a certain block, is performed. Recently, as the number of streams has increased, it has become necessary to support a large number of streams in a limited memory capacity. Writing to more streams than one stream as described above is referred to as multi-stream writing.

When executing multi-stream writing, the controller 4 recognizes identifiers assigned by the command for each of a plurality of streams and manages a plurality of write destination blocks corresponding to the respective identifiers. At this time, the controller 4 sets the same number of blocks as the number of active streams to an open state. The controller 4 then allocates a write destination block in the open state to each of the plurality of active streams.

In the case where a plurality of zones defined in the NVMe zoned namespace standard are used, the controller 4 manages a plurality of blocks corresponding respectively to the plurality of zones. At this time, the controller 4 sets the same number of blocks as the number of opened zones to the open state. Then, the controller 4 allocate a write destination block in the open state to each of the opened zones.

Further, in the case where such a system configuration is used that the host 2 issues to the SSD3 a write command that specifies a block address indicating a write destination block (for example, a write destination super block), the controller 4 allocates a plurality of write destination blocks to the host 2. The controller 4 manages these write destination blocks allocated to the host 2.

In the case where a plurality of storage areas (QoS domains) are created and managed, and a plurality of write destination blocks corresponding respectively to a plurality of placement IDs are managed for each QoS domain, the controller 4 manages the same number of write destination blocks as the number of placement IDs used in each QoS domain for each QoS domain.

Further, in the case where the storage area is physically separated for each namespace, the controller 4 manages the same number of write destination blocks as the number of namespaces, as the physical storage areas for these namespaces.

The DRAM 6 includes a memory area for storing a logical-to-physical address translation table (L2P table) 61. The DRAM 6 further includes a memory area for storing a block management table 62, a memory area used as a DRAM write buffer 63, and a memory area for storing a plurality of virtual write buffers (VWBs) 64.

The L2P table 61 is a table that stores mapping information. The mapping information is information which indicates mapping between each of logical addresses and each of physical addresses of the NAND flash memory 5 in units of a predetermined management size. A logical address is an address used by the host 2 to access the SSD 3. For example, a logical block address (LBA) is used as the logical address. The physical address is an address that indicates a storage location in the NAND flash memory 5. The physical address can be expressed, for example, by a flash die address, a block address, a page address, an offset address in a page, and any combination of all or some of these. In the case where the addresses included in the I/O commands transmitted from the host 2 include a physical address and a logical address, the L2P table may be stored in the memory 22 of the host 2.

The block management table 62 is a table that stores information for managing the status of each of the plurality of blocks included in the NAND flash memory 5.

The DRAM write buffer 63 is a memory area that temporarily stores data to be written to the NAND flash memory 5. The DRAM write buffer 63 may as well be referred to as a first write buffer.

A plurality of VWBs 64 are respectively associated with a plurality of write destination blocks in a one-to-one relationship. Each of VWBs 64 is used to store information indicating an amount of unwritten data for the corresponding write destination block, and the like. The details of the VWBs 64 will be described later.

Next, the internal configuration of the controller 4 will be described. The controller 4 includes, for example, a host interface (host I/F) 41, a static RAM (SRAM) 42, a CPU 43, a direct memory access controller (DMAC) 44, an error correction circuit 45, a NAND interface (NANDI/F) 46 and a DRAM interface (DRAM I/F) 47. The host interface 41, the SRAM 42, the CPU 43, the DMAC 44, the error correction circuit 45, the NAND interface 46, and the DRAM interface 47 are interconnected via an internal bus 40.

The host interface 41 is a communication interface circuit which executes communications with the host 2. The host interface 41 is implemented, for example, by a PCIe controller. For example, in the case where the host interface 41 is a fifth-generation PCIe controller and the number of lanes contained in the bus 7 is four, the data reception rate of the host interface 41 is about 16 gigabytes/second (GB/s). Or, in the case where the host interface 41 is a sixth-generation PCIe controller and the number of lanes contained in the bus 7 is four, the data reception rate of the host interface 41 is about 30 GB/s. Further, the host interface 41 includes an arbitration mechanism (not shown). The arbitration mechanism is a mechanism which selects a submission queue SQ from which an I/O command should be fetched, from a plurality of submission queues SQ included in the SQ/CQ pairs 222. The arbitration mechanism is, for example, a round-robin arbitration mechanism or a weighted round-robin arbitration mechanism.

The SRAM 42 is a volatile memory. The memory area of the SRAM 42 is used, for example, as a work area of the CPU 43. Further, the SRAM 42 includes a memory area which stores an SRAM write buffer 421. The SRAM write buffer 421 is a memory area which temporarily stores data to be written to the NAND flash memory 5. The SRAM write buffer 421 has a capacity smaller than that of the DRAM write buffer 63 and a bandwidth greater than that of the DRAM write buffer 63. The SRAM write buffer 421 may as well be referred to as a second write buffer.

Here, an example will be described with regard to the respective relationships between the capacity and bandwidth of the DRAM write buffer 63 and the capacity and bandwidth of the SRAM write buffer 421.

The bandwidth of a typical DRAM usable for the SSD 3 is, for example, 25 GB/s. With this configuration, the DRAM write buffer 63 has a bandwidth of 25 GB/s. The write process using the DRAM write buffer 63 requires a process of writing data to the DRAM write buffer 63 and a process of reading the data from the DRAM write buffer 63. Therefore, when writing data to the NAND flash memory 5 via the DRAM write buffer 63, the speed of data passing through the DRAM write buffer 63 is half the speed of the bandwidth of the DRAM write buffer 63, which is about 12.5 GB/s.

The capacity of the DRAM write buffer 63 is set, for example, to the capacity given by the formula: [the minimum write size of the NAND flash memory 5]×[the number of write destination blocks]. Here, the minimum write size of the NAND flash memory 5 is the minimum size of data required for the data write operation of the NAND flash memory 5. For example, in the case where the page size is 16 KiB, a mode of the data write operation is a triple level cell (TLC) mode, which stores 3 bits per memory cell, and the number of planes per flash die is four, the minimum write size is 192 KiB (=16 KiB×3 bits×4 planes).

Note that when data is written to a plurality of flash dies in parallel via a plurality of channels, the minimum write size will be even greater. It is assumed here that, for example, the number of channels used for parallel writing is eight. In this case, the minimum write size is about 1.5 MiB (=16 KiB×3 bits×4 plains×8 channels). Here, when the number of write destination blocks is 1000, the capacity of the DRAM write buffer 63 may be set to about 1.5 GB.

On the other hand, the bandwidth of a typical SRAM usable for the controller 4 is sufficiently greater than that of a DRAM. Therefore, the speed of data passing through the SPAM write buffer 421 when writing data to the NAND flash memory 5 via the SRAM write buffer 421 is sufficiently faster than the speed of data passing through the DRAM write buffer 63. The capacity of the SPAM write buffer 421 is set to the capacity given, for example, by [the minimum write size of the NAND flash memory 5]. In other words, when the minimum write size of the NAND flash memory 5 is 1.5 MiB, the capacity of the SRAM write buffer 421 may be set to 1.5 MiB.

The CPU 43 is a processor. The CPU 43 loads a control program (firmware) stored in the NAND flash memory 5 or in a ROM (not shown) to the SRAM 42. Then, the CPU 43 performs various types of processes by executing this firmware. Note that the firmware may as well be loaded to the DRAM 6.

The CPU 43 performs management of the data stored in the NAND flash memory 5 and management of the blocks included in the NAND flash memory 5 as a flash translation layer (FTL), for example. The management of the data stored in the NAND flash memory 5 includes the management of the mapping information, for example. The CPU 43 manages the mapping between each of the logical addresses and each of the physical addresses in units of management size, using the mapping information of the L2P table 61. The management size is, for example, 4 KiB.

In the NAND flash memory 5, data can be written to a page in a block only once per program/erase cycle of this block. In other words, new data cannot be directly overwritten to a storage location (physical storage location) within the block, where data has already been written. Therefore, when updating data that has already been written to the physical storage location within the block, the controller 4 writes new data to a not-yet-written page (free page) within the block (or another block) and handles the previous data as invalid data. In other words, the controller 4 writes update data corresponding to a certain logical address to a physical storage location different from the physical storage location in which the previous data corresponding to this logical address is stored. The controller 4 then updates the L2P table 61 and associates this logical address with a physical address which indicates this other physical storage location.

The management of blocks included in the NAND flash memory 5 includes management of defective blocks (bad blocks) included in the NAND flash memory 5, wear leveling, and garbage collection (GC).

The DMAC 44 is a circuit which performs direct memory access (DMA). The DMAC 15 performs data transfer between the memory 22 of the host 2 and the SRAM 42 (or DRAM 46). For example, in a write process, the DMAC 44 executes the transfer of write data from the host write buffer 221 to the SRAM 42 (or DRAM 6).

The error correction circuit 45 executes the encoding process when data is to be written to the NAND flash memory 5. In the encoding process, the error correction circuit 45 adds an error correction code (ECC) as a redundancy code to the data to be written to the NAND flash memory 5. When data is read from the NAND flash memory 5, the error correction circuit 45 executes the decoding process. In the decoding process, the error correction circuit 45 executes error correction of the data read out from the NAND flash memory 5 by using the ECC added to this data.

The NAND interface 46 is a circuit which controls the NAND flash memory 5. The NAND interface 46 is electrically connected to a plurality of flash dies included in the NAND flash memory 5.

Each flash die can operate independently. Therefore, the flash dies function as parallel operable units. The NAND interface 46 includes, for example, NAND controllers 461-0, 461-1, . . . , 461-7. The NAND controllers 461-0, 461-1, . . . , 461-7 are connected to channels ch0, ch1, . . . , ch7, respectively. The controllers 461-0, 461-1, . . . , 461-7 are each connected to one or more flash dies via the corresponding channel. FIG. 1 illustrates an example case in which four flash dies are connected to each of the channels ch0, ch1, . . . , ch7. In this case, the NAND controller 461-0 is connected to flash dies #0, #8, #16 and #24 via the channel ch0. The NAND controller 461-1 is connected to flash dies #1, #9, #17 and #25 via the channel ch1. Further, the NAND controller 461-7 is connected to flash dies #7, #15, #23 and #31 via the channel ch7. The flash dies #0, #1, . . . , and #7 are handled by the controller 4 as a bank BNK0. The flash dies #8, #9, . . . , #15 are handled by the controller 4 as a bank BNK1. The flash dies #16, #17, . . . , #23 are handled by the controller 4 as a bank BNK2. The flash dies #24, #25, . . . , #31 are handled by the controller 4 as a bank BNK3. A bank is a unit by which a plurality of flash dies are operated in parallel by an interleaving operation.

FIG. 2 is a block diagram illustrating an example of a configuration of the relationship between a plurality of channels and a plurality of flash memory dies used in the memory system according to the embodiment.

As illustrated in FIG. 2, each of the flash dies #0 to #31 includes a plurality of blocks BLK1 to BLKx−1. In the configuration example illustrated in FIGS. 1 and 2, the controller 4 can access the flash dies #0 to #31 in parallel by means of 8 channels and bank interleaving operation. Therefore, the controller 4 can execute write or read of data up to a maximum of 32 flash dies in parallel. Each of the flash dies #0 to #31 may have a multi-plane configuration which includes a plurality of planes. For example, when each of the flash dies #0 to #31 includes four planes, the controller 4 can execute a write or read of data up to a maximum of 128 planes in parallel.

Each of the plurality of write destination blocks may be a single block (physical block) or a super block including a set of a plurality of physical blocks that can be operated in parallel.

One super block may include a total of 32 physical blocks selected one by one from the NAND flash memory dies #0 to #31, though the configuration is not limited to this. Note that each of the NAND flash memory dies #0 to #31 may have a multi-plane configuration. For example, in the case where each of the NAND flash memory dies #0 to #31 has a multiplane configuration including four planes, one super block may include a total of 128 physical blocks selected one by one from 128 planes corresponding to the NAND flash memory dies #0 to #31.

FIG. 3 illustrates an example of a configuration of a super block used in the memory system of the embodiment. FIG. 3 illustrates an example of one super block (SB) which includes thirty two physical blocks (here, the physical block BLK2 in the NAND flash memory die #0, the physical block BLK3 in the NAND flash memory die #1, the physical block BLK7 in the NAND flash memory die #2, . . . , the physical block BLK4 in the NAND flash memory die #24, the physical block BLK6 in the NAND flash memory die #25, . . . , the physical block BLK3 in the NAND flash memory die #31).

Note that such a configuration that one super block includes only one physical block may be adopted, and in such a case, each one super block is equivalent to one physical block. Further, here, the same Pages 0, 1, 2, . . . are set in the super block for the flash dies #0 to #31, but the setting is not limited to this, and can be set up in some other way.

Let us return to the explanation of FIG. 1. The DRAM interface 47 is a circuit which controls the DRAM 6. The DRAM interface 47 stores data in the DRAM 6. Further, the DRAM interface 47 reads data stored in the DRAM 6.

Next, the internal configuration of the CPU 43 will be described. The CPU 43 includes a read process unit 431 and a write process unit 432 in addition to the components that function as FTL (Flash Translation Layer).

Each of the read process unit 431 and the write process unit 432 may be partially or entirely implemented by the dedicated hardware in the controller 4.

The read process unit 431 performs a read process by processing the respective read commands received from the host 2. The read process includes a process of converting a logical address specified by the read command into a physical address by referring to the L2P table 61, a process of reading data from a storage location in the NAND flash memory 5, which is indicated by this physical address, and a process of transferring the read data to the memory 22 of the host 2.

The write process unit 432 executes a write process by processing the respective write commands received from the host 2. The write process includes a process of loading (transferring) write data from the host write buffer 221 to the SRAM write buffer 421 or the DRAM write buffer 63, a process of writing the write data loaded into the SRAM write buffer 421 or the DRAM write buffer 63 to a storage location in the NAND flash memory 5, and a process of updating the L2P table 61 so that a physical address indicating the storage location where the write data has been written is mapped to a logical address specified by the write command.

The write process unit 432 includes a flash management unit 433 and a scheduler 434.

The flash management unit 433 receives a write commands from the submission queue (SQ) of the host 2. The write command includes at least information (first information) indicating the size of write data to be written to the NAND flash memory 5 and information (second information) that is able to directly or indirectly specify a write destination block associated with the write data. The information that is able to indirectly specify the write destination block is, for example, (1) a stream identifier included in a write command used for multi-stream writing, (2) the high-order bit (the upper bit) part of the logical address (Start LBA: SLBA) included in a write command used in the zoned namespace standard, (3) a combination of the QoS domain ID and placement ID included in a write command that specifies the QoS domain of the write destination, or (4) a namespace identifier included in a write command when the storage area is physically separated for each namespace.

The information that is able to directly specify the write destination block is, for example, a block address (super block address) included in a write command issued by the host 2 in a system configuration in which a plurality of write destination blocks are assigned to the host 2.

Based on the second information included in the received write command, the flash management unit 433 classifies the received write command into a first group for writing data to the first write destination block or a second group for writing data to the second write destination block. The first group is a set of write commands for writing data to the same write destination block (in this case, the first write destination block). The data associated with the first group, that is, the data associated with the set of write commands belonging to the first group, is written to the first write destination block corresponding to this first group. The second group is a set of write commands for writing data to the same write destination block (here, the second write destination block). The data associated with the second group, that is, the data associated with the set of write commands belonging to the second group, is written to the second write destination block corresponding to this second group. The flash management unit 433 manages the data associated with the first group and not yet written to the NAND flash memory 5 (unwritten data) using the VWB 64 corresponding to the first write destination block. Further, the flash management unit 433 manages the data associated with the second group and not yet written to the NAND flash memory 5 (unwritten data) using the VWB 64 corresponding to the second write destination block.

Based on the first information (information indicating the size of the write data to be written to the NAND flash memory 5) included in the received write command, the flash management unit 433 determines whether the write speed, which indicates the amount of data required to be written per predetermined time, is greater than or equal to s first value, for each of the first and second groups. In this case, the flash management unit 433 calculates the amount of unwritten data associated with the same group based on the first information included in each of the received write commands for each of the plurality of groups. For example, the flash management unit 433 calculates the amount of unwritten data associated with the first group based on the first information included in each of the write commands classified into the first group. Further, the flash management unit 433 calculates the amount of unwritten data associated with the second group based on the first information included in each of the write commands classified into the second group.

It is assumed here that, for example, write commands CMD1 to CMD5 are received, and the write commands CMD1 to CMD3 are classified into the first group, whereas the write commands CMD4 to CMD5 are classified into the second group. In this case, the flash management unit 433 calculates the sum of the sizes of the write data respectively specified by the write commands CMD1 to CMD3, as the amount of unwritten data associated with the first group. Further, the flash management unit 433 calculates the sum of the sizes of the write data respectively specified by the write commands CMD4 to CMD5, as the amount of unwritten data associated with the second group.

The flash management unit 433 determines whether or not the write speed of the first group is higher than or equal to the first value based on the amount of unwritten data associated with the first group(, which may as well be referred to as the first data). Further, the flash management unit 433 determines whether or not the write speed of the second group is higher than or equal to the first value based on the amount of unwritten data associated with the second group(, which may as well be referred to as the second data).

When the write speed of the first group is higher than or equal to the first value, the flash management unit 433 determines that the first group is a group with a fast write speed. When the write speed of the first group is less than the first value, the flash management unit 433 determines that the first group is a group with a slow write speed. Similarly, when the write speed of the second group is higher than or equal to the first value, the flash management unit 433 determines that the second group is a group with a fast write speed. Or when the write speed of the second group is less than the first value, the flash management unit 433 determines that the second group is a group with a slow write speed.

The scheduler 434 executes the scheduling process. The scheduling process includes a process for periodically selecting a write destination block to which data should be written, from a plurality of write destination blocks. In other words, the scheduling process is a process of selecting one of a plurality of groups which include at least the first and second groups, as a group permitted to write to the NAND flash memory 5. The scheduler 434 executes the scheduling process to select one of the groups which include new write commands whose data is not yet loaded, in response to the start or end of a data write operation in the NAND flash memory 5. In other words, the scheduler 434 selects one of the first and second groups, which includes a new write command whose data is not yet loaded. The unloaded write data is write data which has not yet been loaded into either the DRAM write buffer 63 or the SRAM write buffer 421 and is stored on the host write buffer 221, among the unwritten data. The scheduler 434 selects one group corresponding to one write destination block as the group permitted to write to the NAND flash memory 5, for example, by selecting one of a plurality of VWBs 64 in the scheduling process. The scheduler 434 selects one of VWBs 64 in which a new write command whose write data is not yet loaded has arrived, as the group permitted to write to the NAND flash memory 5.

When a certain VWB 64 (that is, a certain group) is selected by the scheduler 434, the flash management unit 433 determines whether or not the write speed of the selected group is higher than or equal to the first value, that is, whether the selected group is a group with a fast write speed or a slow write speed.

Here, such a case is assumed that the first group is selected and the first group is a group with a slow write speed, that is, the write speed of the first group is less than the first value. The flash management unit 433 loads unloaded write data of the write data corresponding to the first group, that is, write data stored in the host write buffer 221, into the DRAM write buffer 63. Then, the flash management unit 433 transmits to the host 2 one or more completion responses corresponding to one or more write commands associated with the write data loaded into the DRAM write buffer 63. After one or more new write commands belonging to the first group are received and the total amount of unwritten write data corresponding to the first group reaches or exceeds the minimum write size of the NAND flash memory 5, the flash management unit 433 writes the write data (i.e., the unwritten write data) from the DRAM write buffer 63 to the write destination block. This write destination block is the first write destination block allocated to the first group. In writing write data to the first write destination block, the write data read from the DRAM write buffer 63 may be directly transferred to the NAND flash memory 5, or the write data read from the DRAM write buffer 63 may be transferred to the NAND flash memory 5 via some other data buffer such as the SRAM write buffer 421.

Next, such a case is assumed that the second group is selected and the second group is a group with the fast write speed, that is, the write speed of the second group is higher than or equal to the first value. The flash management unit 433 loads the write data associated with the second group and having the minimum write size from the host write buffer 221 to the SRAM write buffer 421 and immediately writes the write data to the destination block. This write destination block is the second write destination block allocated to the selected second group. In this case, the write data loaded into the SRAM write buffer 421 is transferred to the NAND flash memory 5 and then written to the second write destination block allocated to the second group. When the transferring of the write data to the NAND flash memory 5 is completed, the memory area of the SRAM write buffer 421 is released. Thus, the SRAM write buffer 421 becomes available for storing next write data having the minimum write size.

Note that in the above-provided explanation, whether or not the write speed of each group is higher than or equal to the first value is determined by judging whether the amount of unwritten data is greater than or equal to the minimum write size at the timing when the preparation for the next write to the NAND flash memory 5 becomes ready to start. But, the judgment of whether or not the write speed is higher than or equal to the first value can be executed using various other methods based on the first information included in each write command. Note that the first value is automatically controlled to approach a value to be determined from the size of the SRAM write buffer 421, the DRAM write buffer 63 or the virtual write buffer 64, the bandwidth of the SRAM 42, the bandwidth of the DRAM 6 or the like.

Next, the flow of write data in a memory system according to each of comparative examples will be described. FIG. 4 illustrates the flow of write data in the write process of the memory system according to the first comparative example. The first comparative example is an example in which write data corresponding to all groups is written to a NAND flash memory 5A via a small-size write buffer 421A, which is a volatile memory.

In the first comparative example, a controller manages the total amount of write data (unwritten data) corresponding to each of a plurality of groups. When the total amount of write data corresponding to a certain group reaches and exceeds the minimum write size, the controller loads the write data having the minimum write size from a host write buffer 221A to the small-size write buffer 421A. The write data loaded into the small-size write buffer 421A is then written to the NAND flash memory 5A. Here, write data having such a size that can be written to the NAND flash memory 5A is loaded into the small write buffer 421A, the period during which this write data is stored in the small-size write buffer 42A is shortened. With this configuration, each of the write data on the small-size write buffer 421A will not be overtaken by any other write data.

That is, the write data first loaded from the host write buffer 221A into the small-size write buffer 421A is written first from the small-size write buffer 421A into the NAND flash memory 5A. The write data second loaded from the host write buffer 221A into the small-size write buffer 4 is written second to the NAND flash memory 5A from the small-size write buffer 421A. The write data third loaded into the small-size write buffer 421A from the host write buffer 221A is written third to the NAND flash memory 5A from the small-size write buffer 421A. The, the write data fourth loaded from the host write buffer 221A into the small-size write buffer 421A is written fourth to the NAND flash memory 5A from the small-size write buffer 421A.

As described above, (i) the order in which write data are loaded from the host write buffer 221A to the small-size write buffer 421A and (ii) the order in which the write data are written from the small-size write buffer 421A to the NAND flash memory 5A are the same.

However, write data associated with a group having a slow write speed may take a long time before the total amount of write data reaches or exceeds the minimum write size. In this case, this write data is not loaded for a long time from the host write buffer 221A to the small-size write buffer 421A. Until the write data associated with the group with the slow write speed is loaded into the small-size write buffer 421A, it is required that the write data should be maintained in the host write buffer 221A. As a result, the controller cannot return a completion response to the host for each of the write commands belonging to the group having the slow write speed, and thus the latency of the command process is prolonged.

In addition, when there are a large number of groups having a slow write speed, the host write buffer 221A may be occupied by the write data of these groups with the slow write speed.

Figure 5:
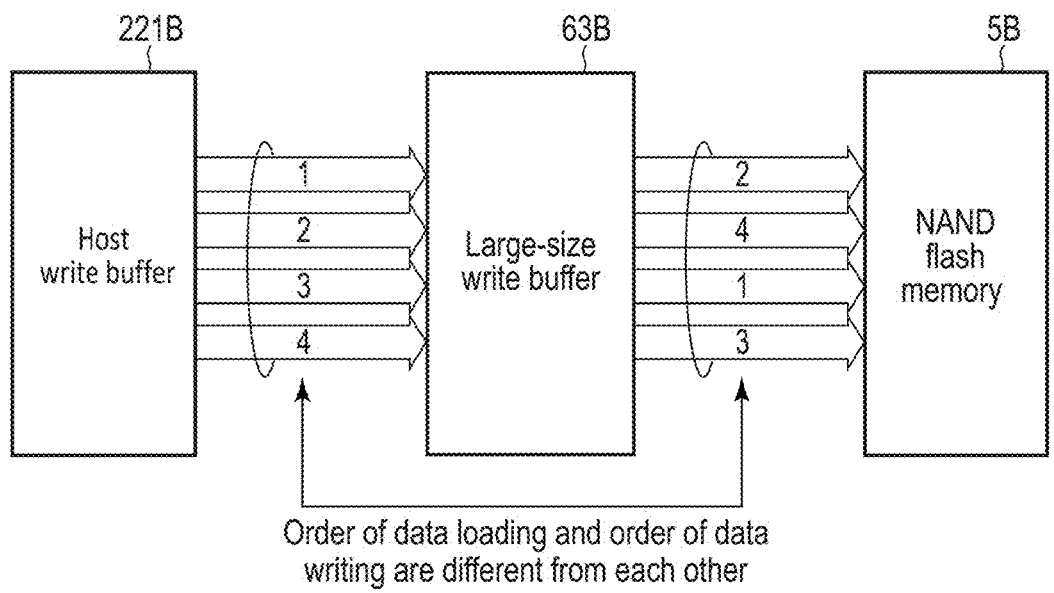
FIG. 5 is a diagram illustrating a flow of write data in a write process of a memory system according to a second comparative example.

FIG. 5 illustrates the flow of write data in a write process of a memory system according to the second comparative example. In the second comparative example, write data corresponding to all groups are written to the NAND flash memory 5B via a large-size write buffer 63B, which is a volatile memory.

In the second comparative example, in response to receiving one write command, the controller loads write data associated with that write command from a host write buffer 221B to the large size write buffer 63B. Then, when the total amount of write data corresponding to one group, among the write data stored in the large-size write buffer 63B reaches the minimum write size, the controller writes the write data having the minimum write size from the large-size write buffer 63B to the NAND flash memory 5. With this configuration, the write data loaded into the large-size write buffer 63B remains in the large-size write buffer 63B until it reaches the minimum write size. Therefore, the period during which write data is stored in the large-size write buffer 63B is prolonged. As a result, the write data may be overtaken by write data associated with another group on the large-size write buffer 63B.

In other words, even in the case of write data loaded first from the host write buffer 221B to the large-size write buffer 63B, if the timing of the total amount of unwritten data in the group corresponding to that write data reaching the minimum write size is the second, then the timing of the writing from the large-size write buffer 63B to the NAND flash memory 5B will be the second. Even in the case of write data loaded second from the host write buffer 221B to the large-size write buffer 63B, if the timing of the total amount of unwritten data of the group corresponding to that write data reaching the minimum write size is the fourth, then the timing of the writing from the large-size write buffer 63B to the NAND flash memory 5B will be the fourth. Even in the case of write data loaded third from the host write buffer 221B to the large-size write buffer 63B, if the timing of the total amount of unwritten data of the group corresponding to that write data reaching the minimum write size is the first, then the timing of the writing from the large-size write buffer 63B to the NAND flash memory 5B will be the first. Further, even in the case of write data loaded fourth from the host write buffer 221B to the large-size write buffer 63B, if the timing of the total amount of unwritten data of the group corresponding to that write data reaching the minimum write size is the third, then the timing of the writing from the large-size write buffer 63B to the NAND flash memory 5B will be the third.

As described above, (i) the order in which write data are loaded from the host write buffer 221B to the large-size write buffer 63B and (ii) the order in which the write data are written from the large-size write buffer 63B to the NAND flash memory 5A are different from each other.

Next, the write process executed in the SSD 3 according to the embodiment will be described. FIG. 6 illustrates the flow of write data in the write process of the memory system according to the embodiment.

Upon receiving a plurality of write commands, the flash management unit 433 of the SSD3 classifies these write commands into a plurality of groups for writing data to different write destination blocks. More specifically, the flash management unit 433 classifies the plurality of write commands into the plurality of groups, based on the second information included in each of the plurality of write commands.

When each write command issued to the SSD3 is a write command which directly specifies a write destination super block, each write command includes the size of write data, the super block address, the start LBA, and the data pointer. The size of the write data is expressed, for example, by the number of LBAs. The super block address is information which indicates a super block to which the write data is to be written. The start LBA is the starting LBA among the LBAs corresponding to the write data. The data pointer is information which indicates a memory location of the host write buffer 221, where the write data is stored. The flash management unit 433 classifies the received plurality of write commands into a plurality of groups based on the super block address included in each of the received write commands, so that a set of write commands that specify the same super block address belong to the same group.

When each write command issued to the SSD3 is a write command used for the multi-stream writing, each write command includes the size of write data, the stream ID, the start LBA, and the data pointer. The data associated with a set of write commands having the same stream ID is, for example, data with the same expected lifetime or data associated with the same application. Based on the stream IDs included respectively in the plurality of write commands received, the flash management unit 433 classifies the received write commands into a plurality of groups so that a set of write commands that specify the same stream ID belong to the same group.

When each write command issued to the SSD3 is a write command that specifies the QoS domain of the write destination, each write command includes the size of write data, the QoS domain ID, the placement ID, the start LBA, and the data pointer. Based on the QoS domain ID and the placement ID included in each of the received write commands, the flash management unit 433 classifies the received write commands into a plurality of groups so that a set of write commands having the same combination of the specified QoS domain ID and the specified placement ID belong to the same group.

When each write command issued to the SSD3 is a write command used in the Zoned Namespace standard, each write command includes the size of write data, the start LBA, and the data pointer. The high-order bit part of the starting LBA is an address that specifies a zone of the write destination. Based on the high-order bit part of the start LBA included in each of the received write commands, the flash management unit 433 classifies the received write commands into a plurality of groups so that a set of write commands that specify the same zone belong to the same group.

When each write command issued to the SSD 3 is a write command that specifies a namespace, each write command includes the size of write data, the namespace ID, the start LBA, and the data pointer. When the storage area is physically divided for each namespace, a single write destination block is specified by the namespace ID. In this case, the flash management unit 433 classifies the received write commands into a plurality of groups based on the high-order bit part of the start LBA included in each of the received write commands, so that a set of write commands that specify the same namespace ID belong to the same group.

In the following descriptions, a plurality of groups may as well be referred to as a plurality of streams. The streams are not limited to narrowly defined streams specified by stream IDs, but are broadly defined streams specified by various identifiers or various addresses described above.

The flash management unit 433 calculates the write speed for each of the plurality of streams based on the size of the write data included in each respective one of the received write commands. The write speed is calculated, for example, by the total amount of write data associated with the write commands issued per predetermined time.

First, the flow of data of a stream(, which may as well be referred to as the first group) whose write speed is higher than or equal to the first value among the plurality of streams will be described.

The flash management unit 433 determines that this stream is a stream with a fast write speed(, which may as well be referred to as a fast stream). The flash management unit 433 loads write data associated with the set of write commands belonging to this stream and having the minimum write size from the host write buffer 221 to the SRAM write buffer 421. Then, the flash management unit 433 writes the write data loaded into the SRAM write buffer 421. to the NAND flash memory 5. Here, since write data having such a size that can be written to the NAND flash memory 5 is loaded into the SRAM write buffer 421, the period during which this write data is stored in the SRAM write buffer 421 is shortened. With this configuration, each of the write data on the SRAM write buffer 421 will not be overtaken by any other write data.

That is, the write data first loaded from the host write buffer 221 to the SRAM write buffer 421 is written first to the NAND flash memory 5 from the SRAM write buffer 421. Then, the write data second loaded from the host write buffer 221 to the SRAM write buffer 421 is written second to the NAND flash memory 5 from the SRAM write buffer 421. The write data third loaded from the host write buffer 221 to the SRAM write buffer 421 is written third to the NAND flash memory 5 from the SRAM write buffer 421. The write data fourth loaded from the host write buffer 221 to the SRAM write buffer 421 is written fourth to the NAND flash memory 5 from the SRAM write buffer 421.

As described above, (i) the order in which write data are loaded from the host write buffer 221 to the SRAM write buffer 421 and (ii) the order in which write data are written from the SRAM write buffer 421 to the NAND flash memory 5 are the same.

In this manner, the write data associated with the fast stream is written to the NAND flash memory 5 via the SRAM write buffer 421. Therefore, the write data associated with the fast stream can be written to the NAND flash memory 5 at a higher speed as compared to the case where the write data associated with the fast stream is written to the NAND flash memory 5 via the DRAM write buffer 63.

Next, the data flow of the stream whose write speed is less than the first value(, which may as well be referred to as the second group) among the plurality of streams will be described.

The flash management unit 433 determines that this stream is a stream with a slow write speed(, which may as well be to as a slow stream). The flash management unit 433 loads the write data associated with the set of write commands belonging to this stream from the host write buffer 221 to the DRAM write buffer 63. Then, when the total amount of unwritten write data corresponding to one group among the write data stored in the DRAM write buffer 63 reaches the minimum write size, the flash management unit 433 writes the write data (unwritten write data) having the minimum write size from the DRAM write buffer 63 to the NAND flash memory 5. Thus, write data loaded into the DRAM write buffer 63 is held in the DRAM write buffer 63 until it reaches the minimum write size. Therefore, the period during which write data is stored in the DRAM write buffer 63 is prolonged. In addition, write data on the DRAM write buffer 63 may be overtaken by any other write data on the DRAM write buffer 63.

That is, even in the case of write data loaded first from the host write buffer 221 to the DRAM write buffer 63, if the timing at which the total amount of unwritten data of the group corresponding to this write data reaches the minimum write size is the second, then the timing of the writing from the DRAM write buffer 63 to the NAND flash memory 5 will be the second. Even in the case where write data second loaded from the host write buffer 221 to the DRAM write buffer 63, if the timing at which the total amount of unwritten data of the group corresponding to this write data reaches the minimum write size is the fourth, then the timing of the writing from the DRAM write buffer 63 to the NAND flash memory 5 will be the fourth. Even in the case of write data third loaded from the host write buffer 221 to the DRAM write buffer 63, if the timing at which the total amount of unwritten data of the group corresponding to this write data reaches the minimum write size is the first, then the timing of the writing from the DRAM write buffer 63 to the NAND flash memory 5 will be the first. Even in the case of write data fourth loaded from the host write buffer 221 to the DRAM write buffer 63, if the timing at which the total amount of unwritten data of the group corresponding to this write data reaches the minimum write size is the third, then the timing of the writing from the DRAM write buffer 63 to the NAND flash memory 5 will be the third.

As described above, (i) the order in which write data are loaded from the host write buffer 221 to the DRAM write buffer 63 and (ii) the order in which write data are written from the DRAM write buffer 63 to the NAND flash memory 5 are different from each other.

As described above, in the present embodiment, even when the total amount of write data associated with a slow stream is less than the minimum write size, this write data is loaded from the host write buffer 221 to the DRAM write buffer 63. Once this write data is loaded into DRAM write buffer 63, the memory area in the host write buffer 221, where this write data has been stored, becomes releasable. Therefore, when the loading of write data into the DRAM write buffer 63 is completed, a completion response to each of the write commands belonging to the slow stream can be returned to the host 2. Therefore, as compared to the comparative example described with reference to FIG. 4, the latency of the command processing for the slow stream can be shortened.

Figure 7:
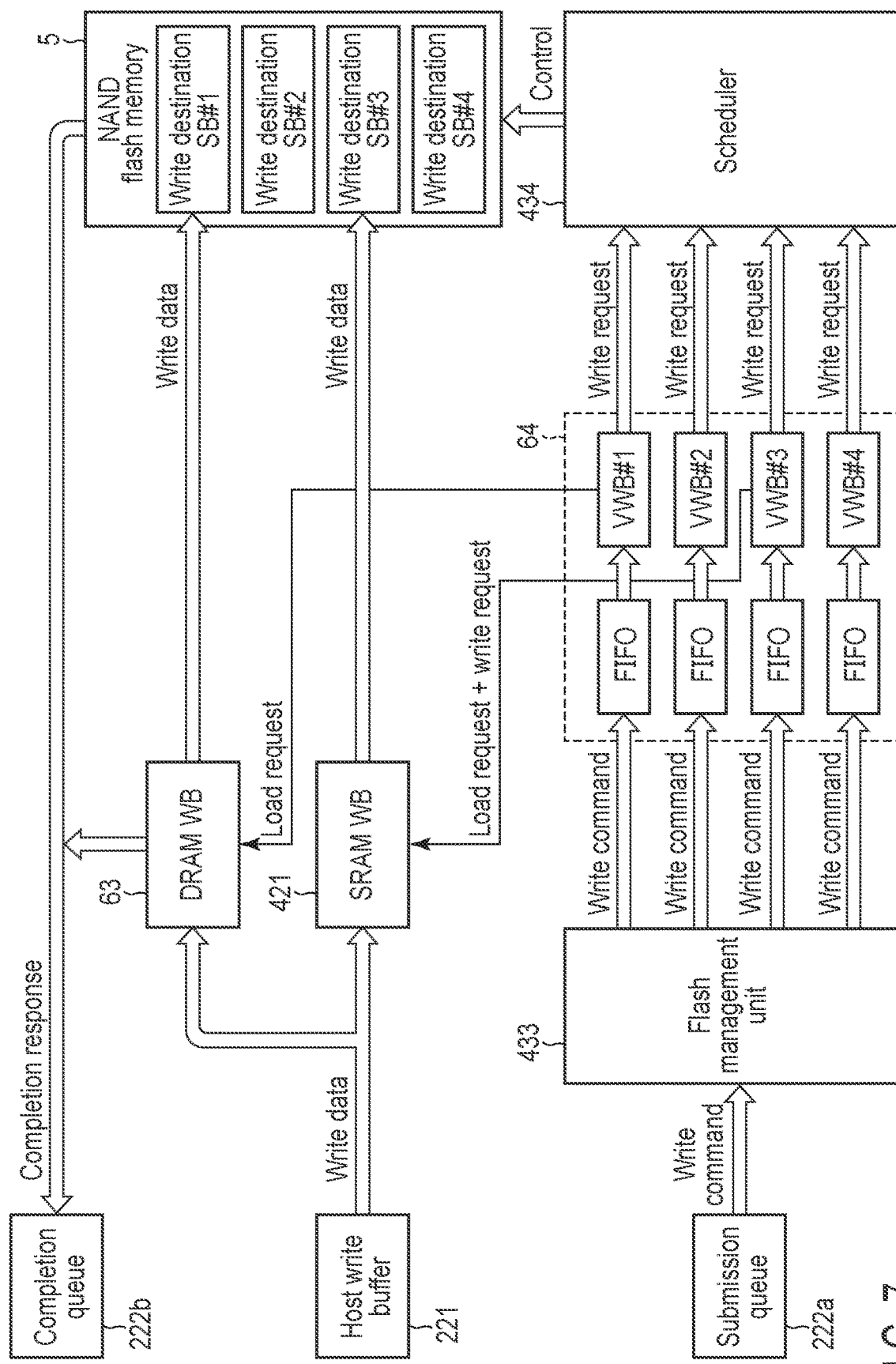
FIG. 7 is a diagram illustrating a flow of write data in another write process of the memory system according to the embodiment.

FIG. 7 illustrates the flow of write data in another write process of the memory system according to the embodiment.

The write speed of individual streams may vary dynamically. In the second example, a write process that can follow dynamic changes in the write speed of streams is executed.

FIG. 7 illustrates an example case where the VWB 64 includes four VWBs #1 to #4 corresponding to write destination super blocks SB #1 to SB #4 and four first-in-first-out (FIFO) buffers corresponding to the four VWBs #1 to #4, respectively.

The flash management unit 433 fetches a plurality of write commands from the submission queue 222a of the host 2.

Based on the second information included in each of the plurality of write commands fetched, the flash management unit 433 classifies the fetched write commands into four streams respectively corresponding to the four write destination super blocks SB #1 to SB #4.

For a stream corresponding to the write destination super block SB #1, the flash management unit 433 stores each of the write commands belonging to this stream in the FIFO which corresponds to the VWB #1. The flash management unit 433 then registers information indicating the total amount of write data associated with the set of write commands stored in this FIFO and information indicating memory locations in the host write buffer 221, where this write data are respectively stored, in the VWB #1. The total amount of write data associated with the set of write commands stored in this FIFO indicates the amount of unwritten data associated with the stream corresponding to the write destination super block SB #1. Unwritten data is data that has not yet been written to the NAND flash memory 5. Thus, the flash management unit 433 manages the unwritten data associated with the stream corresponding to the write destination super block SB #1 using the VWB #1.

For a stream corresponding to the write destination super block SB #2, the flash management unit 433 stores each of the write commands belonging to this stream in the FIFO corresponding to the VWB #2. Then, the flash management unit 433 registers information indicating the total amount of write data associated with the set of write commands stored in this FIFO and information indicating memory locations in the host write buffer 221, where this write data are respectively stored, in the VWB #2. The total amount of write data associated with the set of write commands stored in this FIFO indicates the amount of unwritten data associated with the stream corresponding to the write destination super block SB #2. In this manner, the flash management unit 433 manages the unwritten data of the stream which corresponds to the write destination super block SB #1 using the VWB #2.

For a stream corresponding to the write destination super block SB #3, the flash management unit 433 stores each of the write commands belonging to this stream in the FIFO which corresponds to the VWB #3. Then, the flash management unit 433 registers information indicating the total amount of write data associated with the set of write commands stored in this FIFO and information indicating memory locations in the host write buffer 221, where this write data are respectively stored, in the VWB #3. The total amount of write data associated with the set of write commands stored in this FIFO indicates the amount of unwritten data associated with the stream corresponding to the write destination super block SB #3. In this manner, the flash management unit 433 manages the unwritten data of the stream which corresponds to the write destination super block SB #3 using the VWB #3.

For a stream corresponding to the write destination super block SB #4, the flash management unit 433 stores each of the write commands belonging to this stream in the FIFO which corresponds to the VWB #4. Then, the flash management unit 433 registers information indicating the total amount of write data associated with the set of write commands stored in this FIFO and information indicating memory locations in the host write buffer 221, where this write data are respectively stored, in the VWB #4. The total amount of write data associated with the set of write commands stored in this FIFO indicates the amount of unwritten data associated with the stream corresponding to the write destination super block SB #4. Thus, the flash management unit 433 manages the unwritten data of the stream corresponding to the write destination super block SB #4 the using VWB #4.

Of the VWBs #1 to #4, each VWB in which a new write command whose data is not yet loaded have been arrived notifies to the scheduler 434 that there is a write request. Therefore, the scheduler 434 maintains a list of VWBs in which new write commands whose data are not yet loaded data have been arrived, that is, a list of streams including new write commands whose data have not been loaded.

At the timing when preparation for the next write to the NAND flash memory 5 can be started, that is, in response to the start or end of the data write operation of the NAND flash memory 5, the scheduler 434 selects either one of the VWBs in which new write commands with unloaded data have been arrived, that is, one of the streams including new write commands in which data is not yet loaded, as a VWB (stream) permitted to write.

The flash management unit 433 determines whether or not the amount of unwritten data registered in the VWB selected by the scheduler 434 is greater than or equal to the minimum write size.

Here, such an example case is assumed that the VWB #3 corresponding to the write destination super block (SB) #3 is selected by the scheduler 434. The flash management unit 433 determines whether or not the amount of unwritten data registered in VWB #3 is greater than or equal to the minimum write size. Since the VWB #3 corresponds to the write destination super block SB #3, the amount of unwritten data registered in the VWB #3 is equal to the amount of data to be written to the write destination super block SB #3, that is, the amount of unwritten data associated with the stream corresponding to the VWB #3. Here, such a case is assumed that the amount of unwritten data registered in the VWB #3 is greater than or equal to the minimum write size.

In this case, the flash management unit 433 determines that the stream corresponding to the VWB #3 has a fast write speed. Then, the flash management unit 433 determines whether or not there is data which has already been loaded into the DRAM write buffer 63, among unwritten data registered in the VWB #3. For example, in the case where the amount of unwritten data registered in the VWB #3 is less than the minimum write size when the VWB #3 is selected in the previous scheduling process, some of the unwritten data currently registered in the VWB #3 have already been loaded into the DRAM write buffer 63. On the other hand, in the case where the amount of unwritten data registered in the VWB #3 is greater than or equal to the minimum write size when the VWB #3 is selected in the previous scheduling process, all of the unwritten data registered in the VWB #3 exist in the host write buffer 221, and therefore none of the unwritten data registered in the VWB #3 exists in the DRAM write buffer 63.

When there is unwritten data already loaded into the DRAM write buffer 63, the flash management unit 433 loads unwritten data from each of the DRAM write buffer 63 and the host write buffer 221 into the SRAM write buffer 421 so that the total amount of unwritten data loaded into the SRAM write buffer 421 from both the DRAM write buffer 63 and the host write buffer 221 becomes the minimum write size.

Such a case will be assumed that, for example, the minimum write size is 1.5 MiB, 1.3 MiB of data among the unwritten data registered in the VWB #3 is already loaded into the DRAM write buffer 63, and 0.2 MiB of data among the unwritten data registered in the VWB #3 is unloaded data.

In this case, the flash management unit 433 loads (copies) 1.3 MiB of data from the DRAM write buffer 63 to the SRAM write buffer 421, and then loads 0.2 MiB of data from the host write buffer 221 to the SRAM write buffer 421 via the DRAM write buffer 63 or directly.

After that, the flash management unit 433 writes the unwritten data loaded into the SRAM write buffer 421 to the write destination super block SB #3.

In response to completion of the writing to the write destination super block SB #3, the flash management unit 433 performs the following processing. That is, the flash management unit 443 issues one or more completion responses corresponding to one or more write commands associated with the write data loaded from the host write buffer 221 to the SRAM write buffer 421 and written to the write destination super block SB #3, and store the one or more completion responses in the completion queue 222b. In other words, the flash management unit 433 transmits one or more completion responses corresponding to 0.2 MiB of data among the unwritten data registered in the VWB #1, to the host 2. This is because each of the completion responses corresponding to 1.3 MiB of data among the unwritten data registered in the VWB #3 has already been transmitted to the host 2 when these data were loaded into the DRAM write buffer 63.

In the case where there is no unwritten data that has already been loaded into the DRAM write buffer 63, among the unwritten data registered in the VWB #3, the flash management unit 433 loads the unwritten data registered in the VWB #3, which has the minimum write size, from the host write buffer 221 to the SRAM write buffer 421. After that, the flash management unit 433 writes the unwritten data loaded into the SRAM write buffer 421, to the write destination super block SB #3. In response to completion of the writing to the write destination super block SB #3, the flash management unit 433 performs the following processing. That is, the flash management unit 443 issues one or more completion responses corresponding to one or more write commands associated with the write data loaded from the host write buffer 221 to the SRAM write buffer 421 and written to the write destination super block SB #3, and store the one or more completion responses in the completion queue 222b. That is, all of the 1.5 MiB of data registered in the VWB #3 has been loaded from the host write buffer 221 to the SRAM write buffer 421, and therefore the flash management unit 433 transmits all completion responses corresponding to this 1.5 MiB of data to the host 2.

Next, the case where the VWB #1 corresponding to write destination super block SB #1 is selected by the scheduler 434 will be described. The flash management unit 433 determines whether or not the total amount of unwritten data registered in the VWB #1 is greater than or equal to the minimum write size. Here, since the VWB #1 corresponds to the write destination super block SB #1, the unwritten data registered in the VWB #1 is the data to be written to the write destination super block SB #1. Here, such a case is assumed that the unwritten data registered in the VWB #1 is less than the minimum write size.

In this case, the flash management unit 433 determines that the stream corresponding to the VWB #1 has a slow write speed. Then, the flash management unit 433 loads unloaded data among the unwritten data registered in the VWB #1 from the host write buffer 221 to the DRAM write buffer 63. Subsequently, the flash management unit 433 issues one or more completion responses corresponding to one or more write commands associated with the data loaded into the DRAM write buffer 63, and stores the one or more completion responses in the completion queue 222b.

As described above, in the second example of the write process, the scheduler 434 selects one VWB each time the next write to the NAND flash memory 5 is ready to start. Then, based on whether or not the total amount of unwritten data registered in the selected VWB is greater than or equal to the minimum write size, the DRAM write buffer 63 or the SRAM write buffer 421 is selectively used. Thus, even when the write speed of some streams changes dynamically, the write buffer of the load destination can be appropriately switched between the DRAM write buffer 63 and the SRAM write buffer 421 according to the dynamic change in write speed.

In the above-provided descriptions, the case of copying data loaded into the DRAM write buffer 63 to the SRAM write buffer 421 is described, but it is possible as well to use a method of writing data loaded in the DRAM write buffer 63 directly to the NAND flash memory 5.

Figure 8:
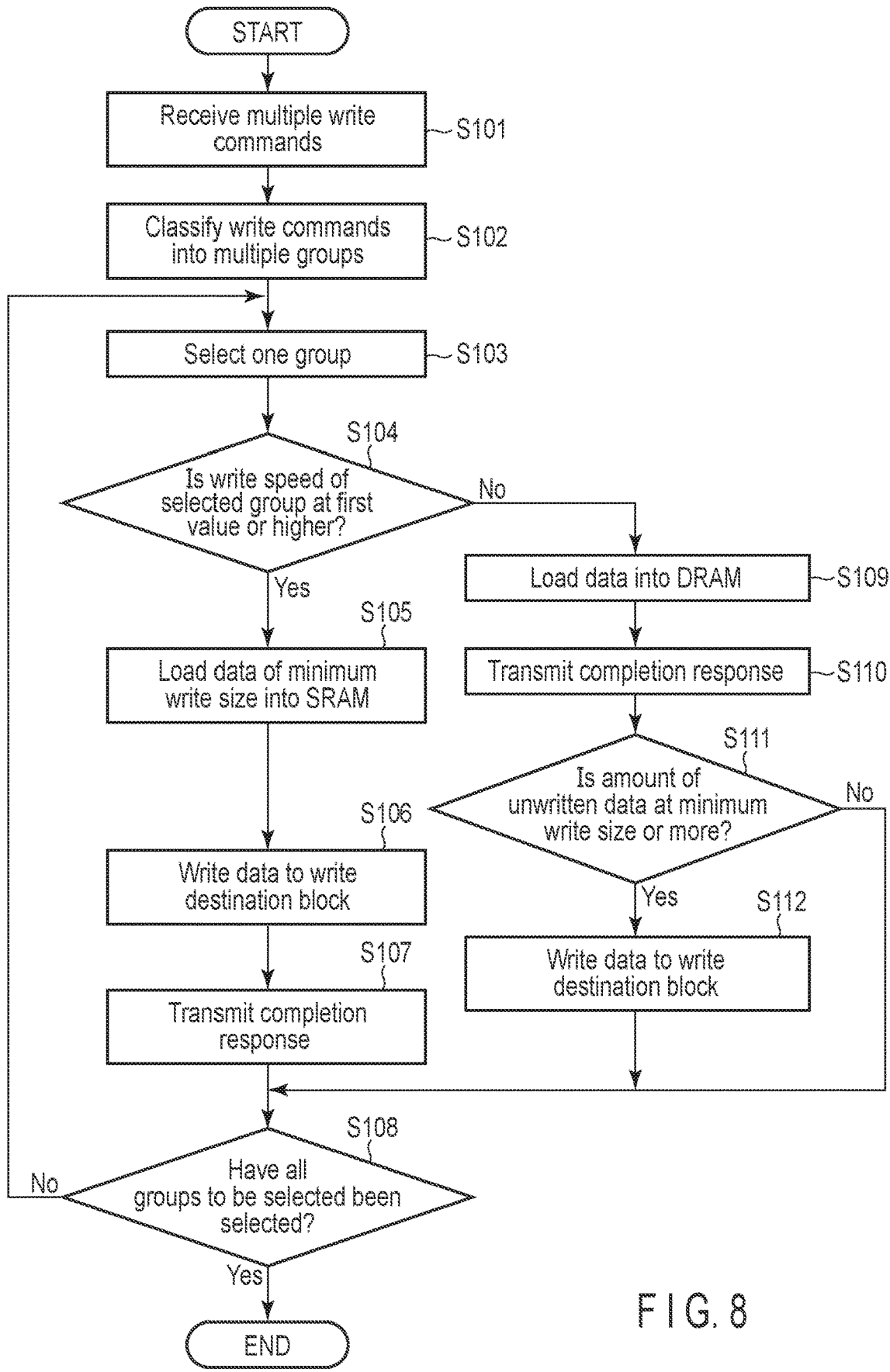
FIG. 8 is a flowchart illustrating a first example of a procedure of the write process executed in the memory system of the embodiment.

Next, the procedure of the write process will be described. FIG. 8 is a flowchart illustrate the first example of the procedure of the write process in the memory system according to the embodiment.

The controller 4 receives a plurality of write commands from the host 2 (step S101).

The controller 4 classifies the received write commands into a plurality of groups respectively corresponding to a plurality of write destination blocks (step S102). More specifically, the controller 4 classifies the received write commands respectively into a plurality of groups based on the second information included in each of the received write commands.

The controller 4 selects one group among groups each including a new write commands whose data has not yet been loaded, as a group permitted to write to the NAND flash memory 5 (step S103). The process of selecting the one group should only be executed at a predetermined timing, and the timing for selecting the one group is not particularly limited.

The controller 4 determines whether or not the write speed of the group selected in S103 is greater than or equal to the first value (step S104). More specifically, the controller 4 calculates the write speed based on the first information included in each of the plurality of write commands received in S101.

When the write speed is greater than or equal to the first value (Yes in S104), the controller 4 loads unloaded data associated with the group selected in S103 and having the minimum write size from the host write buffer 221 to the SRAM write buffer 421 (step S105). The flash management unit 433 of the controller 4 can register information indicating the memory location in the SRAM write buffer 421, where the data is loaded, to the VWB corresponding to the selected group.

The controller 4 writes the data loaded into the SRAM write buffer 421 in S105 having the minimum write size to the write destination block (step S106).

In response to the completion of the write process in S106, the controller 4 transmits one or more completion responses indicating the completion of one or more write commands associated with the data written to the NAND flash memory 5, to the host 2 (step S107).

When there remains an unselected group in the groups each including a new write command whose data is not yet loaded, the controller 4 may newly select some other one of the remaining unselected groups and perform a similar process for the newly selected other group.

In this case, the controller 4 determines whether or not all of the groups each including a new write commands whose data is not yet loaded have been selected (step S108).

When all of the groups each including a new write commands whose data is not yet loaded have been selected in S103 (Yes in S108), the controller 4 terminates the write process.

When there are still unselected groups remaining in the groups each including a new write command whose data is not yet loaded (No in S108), the controller 4 returns to the step of S103 and selects one group from the groups each including a new write command whose data is not yet loaded, that have not yet been selected.

On the other hand, when the write speed of the group selected in S103 is less than the first value (No in S104), the controller 4 loads the data associated with the group selected in S103 and not yet loaded, from the host write buffer 221 to the DRAM write buffer 63 (step S109). The flash management unit 433 of the controller 4 may register information indicating the memory location in the DRAM write buffer 63, where the data is loaded, to the VWB corresponding to the selected group.

The controller 4 transmits one or more completion responses indicating the completion of one or more write commands associated with the data loaded into the DRAM write buffer 63 in S109, to the host 2 (step S110).

In the case where the same group as that selected in S103 in the previous write process is selected, the data associated with this group may have already been loaded into the DRAM write buffer 63. Therefore, the controller 4 determines whether or not the amount of unwritten data associated with the group selected in S103 is greater than or equal to the minimum write size (step S111). For example, the flash management unit 433 of the controller 4 calculates the amount of the unwritten data, based on the information indicating the size of the write data registered in the VWB 64 corresponding to the selected group.

When the amount of unwritten data corresponding to the group selected in S103 is greater than or equal to the minimum write size (Yes in S111), the controller 4 writes the data to the write destination block corresponding to the group selected in S103 (step S112).

When the amount of unwritten data corresponding to the group selected in S103 is less than the minimum write size (No in S111), the controller 4 skips the procedure of S112.

In the next write process, the group selected in S103 may be selected again. In this case, data associated with this group and not yet loaded is loaded from the host write buffer 221 to the DRAM write buffer 63. Then, when the amount of unwritten data for this group is greater than or equal to the minimum write size, the controller 4 writes the unwritten data associated with this group to the destination block corresponding to this group.

Figure 9:
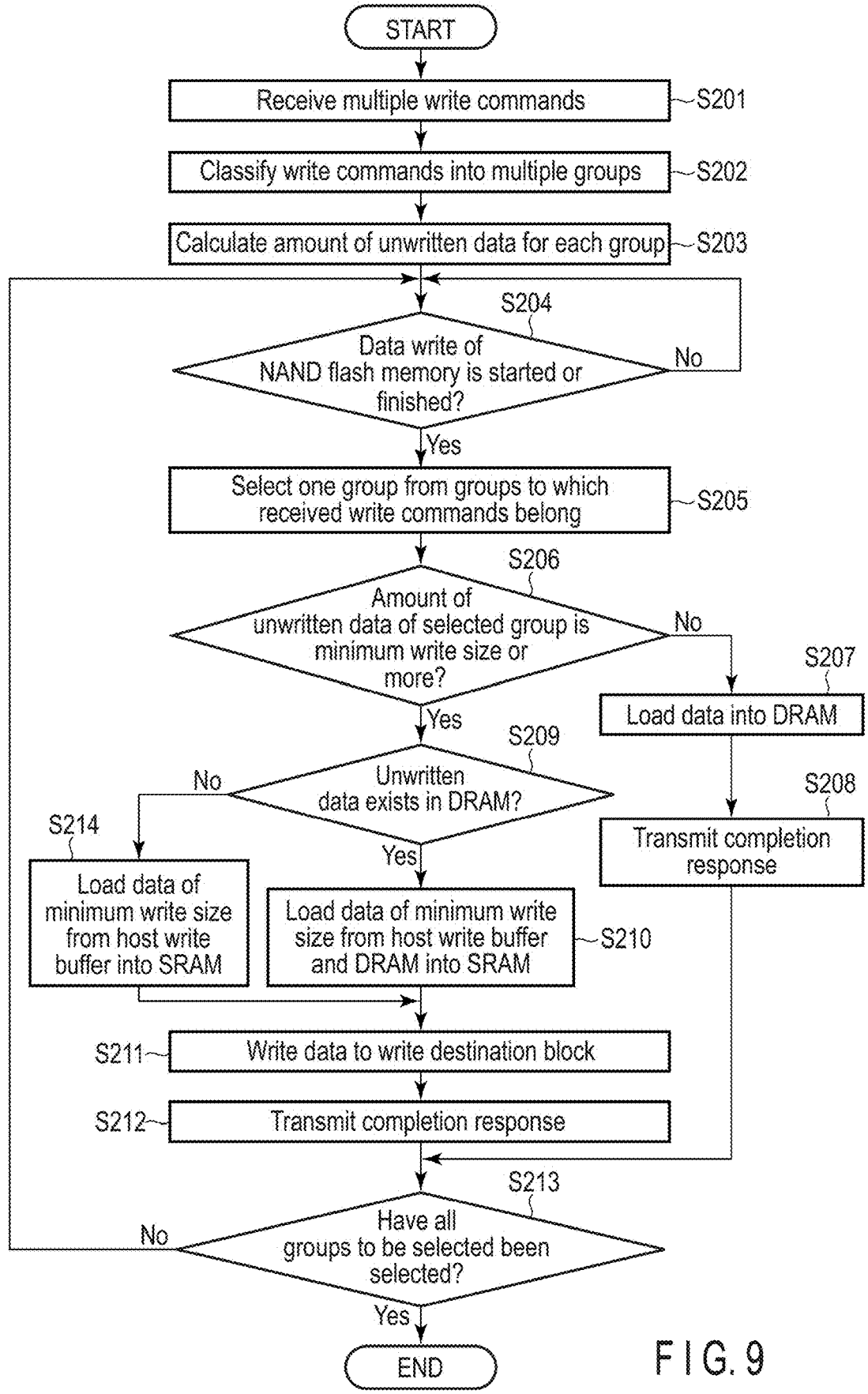
FIG. 9 is a flowchart illustrating a second example of the procedure of the write process executed in the memory system of the embodiment.

FIG. 9 is a flowchart illustrating the second example of the procedure of the write process in the memory system according to the embodiment.

Here, it is assumed that the write buffer of the load destination is appropriately switched between the DRAM write buffer 63 and the SRAM write buffer 421 according to dynamic changes in the write speed of the stream.

The controller 4 receives a plurality of write commands from the host 2 (step S201).

The controller 4 classifies the received write commands into a plurality of groups corresponding respectively to a plurality of write destination blocks (step S202). More specifically, the controller 4 classifies the received write commands into a plurality of groups based on the second information included in each of the received write commands.

The controller 4 calculates the amount of unwritten data associated with the same group for each of the plurality of groups (step S203). More specifically, the controller 4 calculates the amount of unwritten data for each group, based on the first information indicating the size of the write data registered in each VWB.

The controller 4 determines whether or not the data write operation in the NAND flash memory 5 has been started or finished (step S204).

In the case where neither the timing corresponds to when the data write operation in the NAND flash memory 5 has been started or finished (No in S204), the controller 4 waits until the data write operation in the NAND flash memory 5 is started or finished.

When the data write operation in the NAND flash memory 5 is started or finished (Yes in S204), the controller 4 selects one of the groups each including a new write command whose data has not yet been loaded (step S205).

The controller 4 determines whether or not the amount of unwritten data associated with the group selected in S205 is greater than or equal to the minimum write size, based on the amount of unwritten data calculated in S203 (step S206).

When the amount of unwritten data is less than the minimum write size (No in S206), the controller 4 loads the unloaded data associated with the group selected in S205 from the host write buffer 221 to the DRAM write buffer 63 (step S207). The flash management unit 433 of the controller 4 can register information indicating the memory location in the DRAM write buffer 63, where the data is loaded, to the VWB corresponding to the selected group.

The controller 4 transmits one or more completion responses indicating the completion of one or more write commands associated with the data loaded into the DRAM write buffer 63 in S207, to the host 2 (step S209).

When the amount of unwritten data associated with the group selected in S205 is greater than or equal to the minimum write size (Yes in S206), the controller 4 determines whether or not there is unwritten data associated with the group selected in S205 and already loaded into the DRAM write buffer 63 (step S209).

When there is unwritten data associated with the group selected in S205 and already loaded into the DRAM write buffer 63 (Yes in S209), the controller 4 loads the unwritten data associated with the selected group from each of the DRAM write buffer 63 and the host write buffer 221 into the SRAM write buffer 421 so that the total amount of unwritten data loaded from both the DRAM write buffer 63 and the host write buffer 221 into the SRAM write buffer 421 becomes the minimum write size (step S210).

The controller 4 writes the data loaded into the SRAM write buffer 421 in S210, to the write destination block (step S211).

In response to the completion of the data write process in S211, the controller 4 transmits one or more completion responses indicating the completion of one or more write commands associated with the write data loaded from host write buffer 221 in S210 to the SRAM write buffer 421 and written to the write destination block in S211, to the host (step S212).

The controller 4 that has transmitted the completion responses in S212 determines whether or not all of the groups each including a new write command whose data is not yet loaded have been selected (step S213).

When all of the groups each including a new write command whose data is not yet loaded have been selected in S205 (Yes in S213), the controller 4 terminates the write process.

When there are still unselected groups remaining in the group each including a new write command whose data is not yet loaded (No in S213), the controller 4 returns its operation to step S204. Then, at the timing when the data write operation in the NAND flash memory 5 has been started or finished, the controller 4 selects one group from the groups that have not yet been selected among the groups each including a new write command whose data is not yet loaded.

When there is no unwritten data associated with the selected group and already loaded in the DRAM write buffer 63 (No in S209), the controller 4 loads the unloaded data associated with the group selected in S205 and having the minimum write size from the host write buffer 221 to the SRAM write buffer 421 (step S213).

Then, the controller 4 writes the data loaded into the SRAM write buffer 421 in S214 to the write destination block (step S211) and transmits one or more completion responses indicating the completion of one or more write commands associated with the data written to the write destination block in S211, to the host 2 (step S212).

The controller 4 that has transmitted the completion responses in S212 determines whether or not all of the groups each including a new write command whose data is not yet loaded have been selected (step S213).

When the groups including a new write commands whose data is not yet loaded are all selected in S205 (Yes in S213), the controller 4 terminates the write process.

When there are still unselected groups remaining in the group each including a new write commands whose data is not yet loaded (No in S213), the controller 4 returns its operation to step S204.

Figure 10:
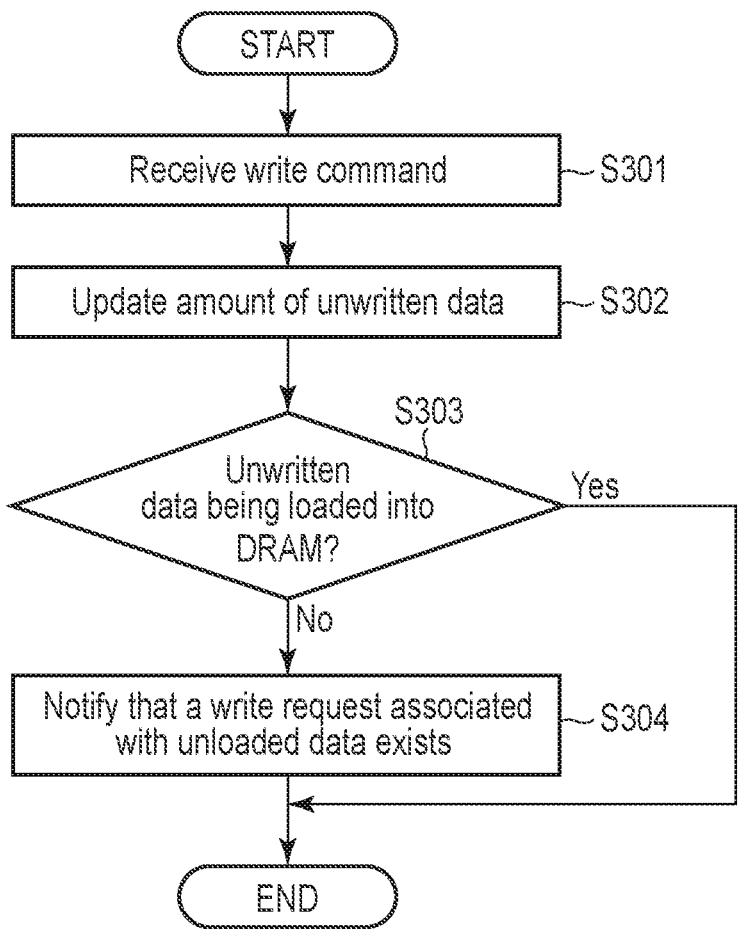
FIG. 10 is a flowchart illustrating a procedure at the time of receiving a write command, executed in the memory system of the embodiment.

Next, the operation to be executed when a write command is received from the host 2 will be described in detail. FIG. 10 is a flowchart illustrating the procedure at the time of receiving a write command in the memory system according to the embodiment.

The controller 4 receives a write command from the host 2 (step S301). More specifically, the controller 4 fetches the write command from the submission queue 222a.

The controller 4 adds the size of the write data associated with the received write command to the amount of unwritten data in the group to which the write command received in S301 belongs, thereby updating the amount of unwritten data (step S302).

The controller 4 determines whether or not unwritten data is being loaded into the DRAM write buffer 63 (step S303).

When the unwritten data is being loaded into the DRAM write buffer 63 (Yes in S303), the controller 4 terminates the write command receiving operation.

When unwritten data is not being loaded into the DRAM write buffer 63 (No in S303), the flash management unit 433 of the controller 4 notifies to the scheduler 434 of controller 4 that a new write command whose data is not yet loaded exists in the group to which the write command received in S301 belongs (step S304).

Figure 11:
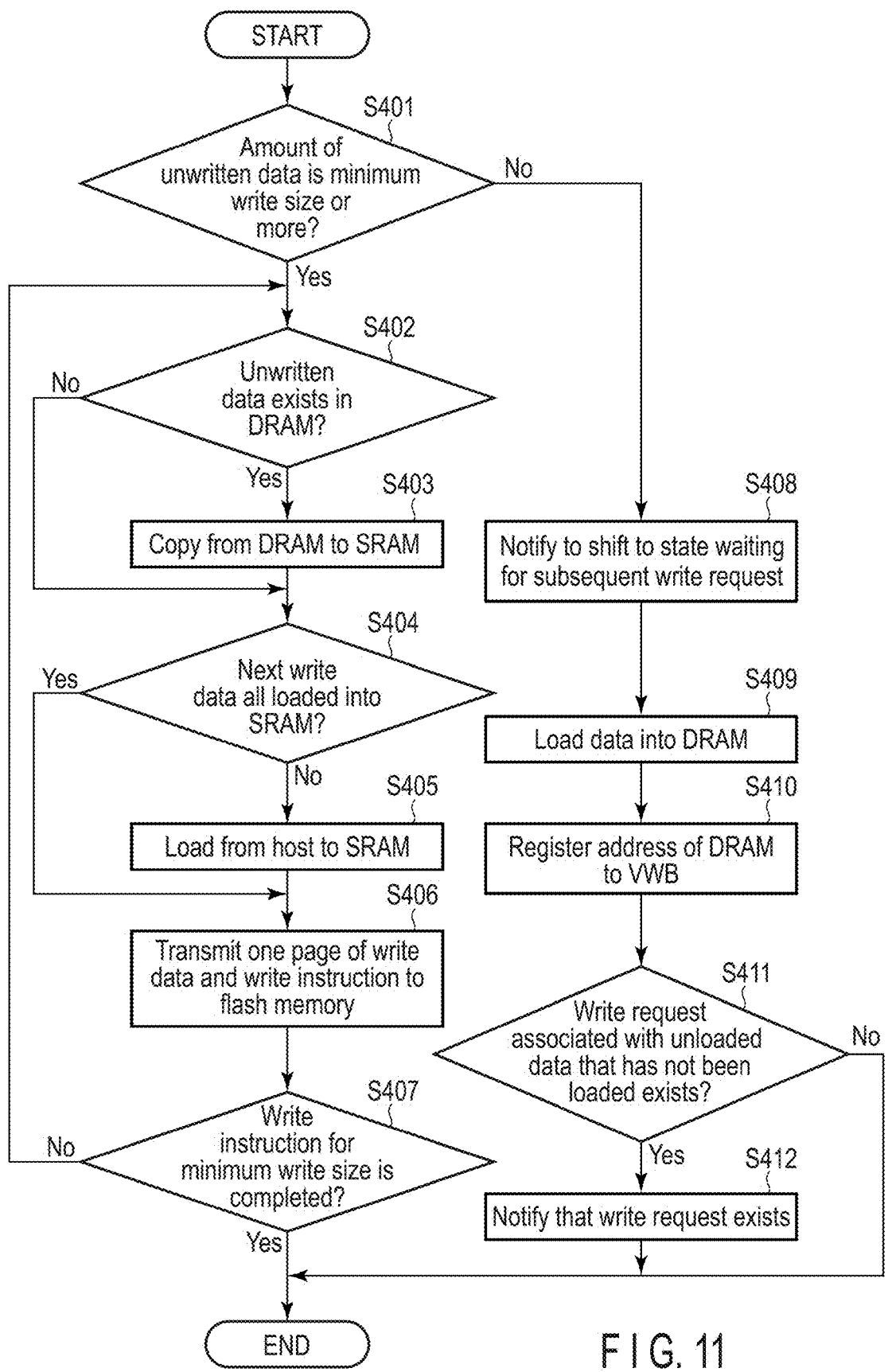
FIG. 11 is a flowchart illustrating a procedure for a write operation executed in the memory system according to the embodiment.

Next, the procedure for writing data to the NAND flash memory after the completion of the write command receiving operation shown in FIG. 10 will be described. FIG. 11 is a flowchart illustrating the procedure of the write operation executed in the memory system according to the embodiment. In the controller 4, the scheduler 434 of the controller 4 selects one group from a plurality of groups in response to the start or end of a data write operation of the NAND flash memory 5 and starts the write operation corresponding to the selected group. For example, the scheduler 434 may select one group from the groups corresponding to the notification issued in S304 of FIG. 10.

The controller 4 determines whether or not the total amount of unwritten data associated with the group selected by the scheduler 434 is greater than or equal to the minimum write size (step S401).

When the total amount of unwritten data is greater than or equal to the minimum write size (Yes in S401), the controller 4 determines whether or not there is unwritten data associated with the selected group and already loaded in the DRAM write buffer 63 (step S402).

When there is unwritten data associated with the selected group and already loaded into the DRAM write buffer 63 (Yes in S402), the controller 4 copies this unwritten data from the DRAM write buffer 63 to the SRAM write buffer 421 (step S403).

When there is no unwritten data associated with the selected group and already loaded in the DRAM write buffer 63 (No in S402), the controller 4 skips the procedure of step S403.

The controller 4 determines whether or not write data to be written next to the write destination block have all been loaded into the SRAM write buffer 421 (Step S404).

When there is data that has not yet been loaded into the SRAM write buffer 421 among the write data to be written next to the write destination block (No in S404), the controller 4 loads the unloaded write data from the host write buffer 221 into the SRAM write buffer 421 (step S405).

When write data to be written next to the write destination block have all been loaded into the SRAM write buffer 421 (Yes in S404), the controller 4 skips the procedure in step S405.

The controller 4 sends one page of write data and write instructions from the SRAM write buffer 421 to the NAND flash memory 5 (step S406).

The controller 4 determines whether or not the write instructions for the minimum write size have been completed (step S407).

When the write instructions for the minimum write size have not been completed (No in S407), the controller 4 returns its operation to the procedure in step S402 and executes the writing of the subsequent write data.

When the write instructions for the minimum write size have been completed (Yes in S407), the controller 4 terminates the write operation.

When the total amount of unwritten data is less than the minimum write size (No in step S401), the controller 4 notifies the scheduler 434 that the selected group will shift to a state waiting for subsequent write commands (step S408).

The controller 4 loads the unloaded data associated with the selected group into the DRAM write buffer 63 (step S409).

The controller 4 registers information indicating the storage location in the DRAM write buffer 63, where the data is loaded in S409, in the VWB 64 (step S410).

Then, the controller 4 determines whether or not there is a write command associated with unloaded data that has not been loaded in the DRAM write buffer 63 and existing on the host write buffer 221 (step S411). The write command associated with the data which can correspond to unloaded data in step S411 is, for example, a write command received during loading of data in step S409 and for which the notification in step S304 of FIG. 10 could not be issued.

When there is a write command associated with unloaded data (Yes in S411), the controller 4 notifies the scheduler 434 that there is a write request (step S412) and terminates the write operation.

When there is no write command associated with unloaded data (No in S411), the controller 4 skips the procedure of step S412 and terminates the write operation.

As described above, in the SSD 3 of the embodiment, the controller 4 executes either writing data using the SRAM write buffer 421 or writing data using the DRAM write buffer 63, in accordance with the write speed of each of the plurality of groups.

When the selected group has a higher write speed, the controller 4 loads write data into the SRAM write buffer 421 and writes the loaded write data to the NAND flash memory 5. That is, the controller 4 writes the write data to the write destination block of the NAND flash memory 5 via the SRAM write buffer 421. Here, although it is considerable that write data is written to the NAND flash memory 5 via the DRAM write buffer 63, in this case the bandwidth of the DRAM 6 may be bottlenecked, and thus the write performance of the SSD 3 may be limited. The bandwidth of the SRAM 42 is sufficiently greater compared to that of the DRAM 6. Therefore, by writing the write data associated with the group having a fast write speed to the NAND flash memory 5 via the SRAM write buffer 421, the write data can be written to the NAND flash memory 5 at a higher speed, compared to the case of writing the write data to the NAND flash memory 5 via the DRAM write buffer 63.

On the other hand, when the selected group has a low write speed, write data associated with the selected group is loaded into the DRAM write buffer 63, and after subsequent write commands belonging to the selected group are received and the amount of write data associated with the selected group reaches the minimum write size, the write data associated with the selected group is written to the NAND flash memory 5. Therefore, the volatile memory used as the write buffer needs to have sufficient capacity to store the write data. Therefore, when all volatile memories are implemented by the SRAM 42, an increase in cost may be caused. Thus, with the use of relatively inexpensive DRAM 6, it is possible to avoid the increase in cost.

Further, the controller 4 transmits a completion response to the host 2 when write data is stored in the DRAM write buffer 63. Thus, it is possible to shorten the latency of command processing for groups with slow write speeds.

Further, in this system, one VWB is selected each time the preparation for the next write to the NAND flash memory 5 becomes ready to start. Then, based on whether or not the amount of unwritten data registered in the selected VWB is greater than or equal to the minimum write size, the DRAM write buffer 63 or the SRAM write buffer 421 is selectively used. Thus, even when the write speed of some streams changes dynamically, a write buffer of the load destination can be appropriately switched between the DRAM write buffer 63 and the SRAM write buffer 421 according to the dynamic change in write speed.

While certain embodiments have been described, these embodiments have been presented by way of example only, and are not intended to limit the scope of the inventions. Indeed, the novel devices and methods described herein may be embodied in a variety of other forms; furthermore, various omissions, substitutions and changes in the form of the embodiments described herein may be made without departing from the spirit of the inventions. The accompanying claims and their equivalents are intended to cover such forms or modification as would fall within the scope and spirit of the inventions.

What is claimed is:

1. A memory system comprising:
a nonvolatile memory including a plurality of blocks;
a first write buffer;
a second write buffer having a capacity smaller than that of the first write buffer and a bandwidth greater than that of the first write buffer; and
a controller configured to manage a plurality of write destination blocks allocated from the plurality of blocks, wherein
the controller is capable of receiving, from a host, a write command that includes first information indicating a size of data to be written to the nonvolatile memory and second information being able to directly or indirectly specify a write destination block associated with the data from a host,
the controller is configured to:
classify the received write command into a first group for writing data to a first write destination block or a second group for writing data to a second write destination block, based on the second information included in the received write command;
determine, based on the first information included in the received write command, whether a write speed, which indicates an amount of data required to be written per predetermined time, is greater than or equal to a first value for each of the first and second groups;
when the write speed of the first group is less than the first value, load unloaded data among first data associated with the first group from a memory of the host into the first write buffer, and after an amount of the first data reaches or exceeds a minimum write size of the nonvolatile memory, write the first data to the first write destination block allocated to the first group; and
when the write speed of the second group is greater than or equal to the first value, load second data associated with the second group and having the minimum write size from the memory of the host into the second write buffer, and write the second data to a second destination block allocated to the second group.

2. The memory system of claim 1, wherein
the controller is further configured to:
after completion of loading the first data into the first write buffer, transmit to the host one or more completion responses indicating completion of processing one or more write commands belonging to the first group and corresponding to the first data.

3. The memory system of claim 2, wherein
the controller is further configured to:
after completion of writing the second data to the second destination block, transmit to the host one or more completion responses indicating completion of processing of one or more write commands belonging to the second group and corresponding to the second data.

4. The memory system of claim 1, wherein
the controller is configured to:
calculate an amount of unwritten data associated with the first group based on the first information included in each of write commands classified into the first group, and calculate an amount of unwritten data associated with the second group based on the first information included in each of write commands classified into the second group;
select one of the first and second groups, which includes a new write command whose data is not yet loaded, in response to start or end of a data write operation of the nonvolatile memory;
determine whether an amount of unwritten data in the selected group is greater than or equal to the minimum write size; and
determine, based on a result of the determining of the amount of the unwritten data, whether the write speed of the selected group is greater than or equal to the first value.

5. The memory system of claim 1, wherein
the first write buffer is implemented by a dynamic random access memory, and
the second write buffer is implemented by a static random access memory.

6. A memory system comprising:
a non-volatile memory including a plurality of blocks;
a first write buffer;
a second write buffer having a capacity smaller than that of the first write buffer and a bandwidth greater than that of the first write buffer; and
a controller configured to manage a plurality of write destination blocks allocated from the plurality of blocks, wherein
the controller is configured to:
receive, from a host, a plurality of write commands each including first information indicating a size of data to be written to the nonvolatile memory and second information being able to directly or indirectly specify a write destination block associated with the data;
classify the received plurality of write commands into a plurality of groups for writing data to different write destination blocks, based on the second information included in each of the received plurality of write commands;
calculate, based on the first information included in each of the received plurality of write commands, an amount of unwritten data associated with a same group, for each of the plurality of groups;
in response to start or end of a data write operation of the nonvolatile memory, select one of groups including new write commands whose data is not yet loaded;
determine whether an amount of unwritten data associated with the selected group is greater than or equal to a minimum write size of the nonvolatile memory;
when the amount of the unwritten data associated with the selected group is less than the minimum write size,
load the unwritten data associated with the selected group from a memory of the host into the first write buffer;
when the amount of the unwritten data associated with the selected group is greater than or equal to the minimum write size,
determine whether there is unwritten data associated with the selected group and already loaded into the first write buffer; and
when there is the unwritten data associated with the selected group and already loaded into the first write buffer, load the unwritten data associated with the selected group from each of the first write buffer and the memory of the host into the second write buffer so that a total amount of the unwritten data loaded into the second write buffer from both the first write buffer and the memory of the host becomes the minimum write size, and write the unwritten data loaded into the second write buffer to a write destination block allocated to the selected group.

7. The memory system of claim 6, wherein
the controller is further configured to:
when there is no unwritten data associated with the selected group and already loaded into the first write buffer, load unwritten data associated with the selected group and having the minimum write size from the memory of the host into the second write buffer, and write the unwritten data loaded into the second write buffer to the write destination block allocated to the selected group.

8. The memory system of claim 6, wherein
the controller is further configured to:
after completion of loading the unwritten data into the first write buffer, transmit to the host one or more completion responses indicating completion of processing one or more write commands belonging to the selected group and corresponding to the unwritten data loaded into the first write buffer.

9. The memory system of claim 8, wherein
the controller is further configured to:
after completion of writing the unwritten data to the write destination block allocated to the selected group, transmit to the host one or more completion responses indicating completion of processing one or more write commands belonging to the selected group and corresponding to the unwritten data loaded from the memory of the host into the second write buffer.

10. The memory system of claim 8, wherein
the first write buffer is implemented by a dynamic random access memory, and
the second write buffer is implemented by a static random access memory.

11. A method for controlling a non-volatile memory, a first write buffer, and a second write buffer which are included in a memory system, the non-volatile memory including a plurality of blocks, the second write buffer having a capacity smaller than that of the first write buffer and a bandwidth greater than that of the first write buffer, the method comprising:
managing a plurality of write destination blocks allocated from the plurality of blocks;
receiving, from a host, a write command that includes first information indicating a size of data to be written to the nonvolatile memory and second information being able to directly or indirectly specify a write destination block associated with the data;
classifying the received write command into a first group for writing data to a first write destination block or a second group for writing data to a second write destination block, based on the second information included in the received write command;

determining, based on the first information included in the received write command, whether a write speed, which indicates an amount of data required to be written per predetermined time, is greater than or equal to a first value for each of the first and second groups;

in response to determining that the write speed of the first group is less than the first value, loading unloaded data among first data associated with the first group from a memory of the host into the first write buffer, and after an amount of the first data reaches or exceeds a minimum write size of the nonvolatile memory, write the first data to a first write destination block allocated to the first group; and in response to determining that the write speed of the second group is greater than or equal to the first value, loading second data associated with the second group and having the minimum write size from the memory of the host into the second write buffer, and writing the second data to a second write destination block allocated to the second group block.

12. The method of claim 11, further comprising:
after completion of loading the first data into the first write buffer, transmitting to the host one or more completion responses indicating completion of processing one or more write commands belonging to the first group and corresponding to the first data.

13. The method of claim 12, further comprising:
after completion of writing the second data to the second write destination block, transmitting to the host one or more completion responses indicating completion of processing of one or more write commands belonging to the second group and correspond to the second data.

14. The control method of claim 11, wherein
the determining whether the write speed is greater than or equal to the first value for the first and second groups, includes:

calculating an amount of unwritten data associated with the first group based on the first information included in each of write commands classified into the first group;

calculating an amount of unwritten data associated with the second group based on the first information included in each of write commands classified into the second group;

selecting one of the first and second groups, which includes a new write command whose data is not yet loaded, in response to start or end of a data write operation of the nonvolatile memory;

determining whether an amount of unwritten data in the selected group is greater than or equal to the minimum write size; and determining, based on a result of the determining of the amount of the unwritten data, whether the write speed of the selected group is greater than or equal to the first value.

* * * * *